United States Patent
Pandey et al.

(10) Patent No.: US 10,790,873 B2
(45) Date of Patent: Sep. 29, 2020

(54) TRANSCEIVER AND METHOD OF ADJUSTING THE TX SIGNAL OF THE TRANSCEIVER FOR WEAKENING EMI

(71) Applicant: NXP B.V., Eindhoven (NL)

(72) Inventors: Sujan Pandey, Waalre (NL); Johannes Petrus Antonius Frambach, Numegen (NL)

(73) Assignee: NXP B.V., Eindhoven (NL)

(*) Notice: Subject to any disclaimer, the term of this patent is extended or adjusted under 35 U.S.C. 154(b) by 0 days.

(21) Appl. No.: 16/206,541

(22) Filed: Nov. 30, 2018

(65) Prior Publication Data
US 2019/0199400 A1    Jun. 27, 2019

(30) Foreign Application Priority Data

Dec. 21, 2017  (EP) .................................. 17209799

(51) Int. Cl.
*H04B 3/04* (2006.01)
*H04B 3/30* (2006.01)
*H04B 3/28* (2006.01)
*H04L 1/00* (2006.01)
*H04L 27/02* (2006.01)

(52) U.S. Cl.
CPC ................ *H04B 3/04* (2013.01); *H04B 3/28* (2013.01); *H04B 3/30* (2013.01); *H04L 1/0009* (2013.01); *H04L 27/02* (2013.01)

(58) Field of Classification Search
CPC .... H04B 3/04; H04B 3/30; H04B 3/28; H04L 1/0009; H04L 27/02
See application file for complete search history.

(56) References Cited

U.S. PATENT DOCUMENTS

| 6,052,420 A * | 4/2000 | Yeap | H04B 15/00 |
| | | | 375/258 |
| 7,949,056 B2 * | 5/2011 | Yamashita | H04B 3/30 |
| | | | 375/229 |

(Continued)

FOREIGN PATENT DOCUMENTS

| EP | 1 636 917 | 3/2006 |
| WO | 2005101684 A1 | 10/2005 |

OTHER PUBLICATIONS

Notice of Allowance for U.S. Appl. No. 16/206,382 12 pgs. (dated Oct. 22, 2019).

*Primary Examiner* — Jean B Corrielus
(74) *Attorney, Agent, or Firm* — Rajeev Madnawat

(57) ABSTRACT

The present application relates to a transceiver, TX/RX PHY, and a method of operating the TX/RX PHY arranged for bi-directional data communication of a node with a counterpart node connected to in a point-to-point network using differential mode signaling over a single twisted-pair cable. A TX adjustment component is arranged in a TX path of the TX/RX PHY and configured to adjust a TX data communication signal generated by the TX/RX PHY for transmittal to the counterpart node. The TX adjustment component is further configured to accept information about a common mode signal detected on the single twisted-pair cable and to adjust the TX data communication signal to at least weaken the common mode signal occurring at the counterpart node in response to transmitting the TX data communication signal.

14 Claims, 14 Drawing Sheets

(56) References Cited

U.S. PATENT DOCUMENTS

| | | | |
|---|---|---|---|
| 8,284,007 B1 | 10/2012 | Langner et al. | |
| 8,891,595 B1* | 11/2014 | Farjadrad | H04L 12/10 375/219 |
| 9,912,375 B1* | 3/2018 | Sedarat | H01F 19/04 |
| 2006/0159186 A1* | 7/2006 | King | H04L 5/20 375/258 |
| 2011/0069794 A1* | 3/2011 | Tavassoli Kilani | H04L 25/0274 375/346 |
| 2011/0296267 A1* | 12/2011 | Malkin | H04L 5/16 714/746 |
| 2012/0155527 A1* | 6/2012 | Gruendler | H04B 3/30 375/226 |
| 2013/0165067 A1* | 6/2013 | DeVries | H04B 1/123 455/307 |
| 2014/0036976 A1 | 2/2014 | Shad | |
| 2017/0187472 A1 | 6/2017 | Chini et al. | |
| 2018/0024620 A1 | 1/2018 | Gardner | |

* cited by examiner

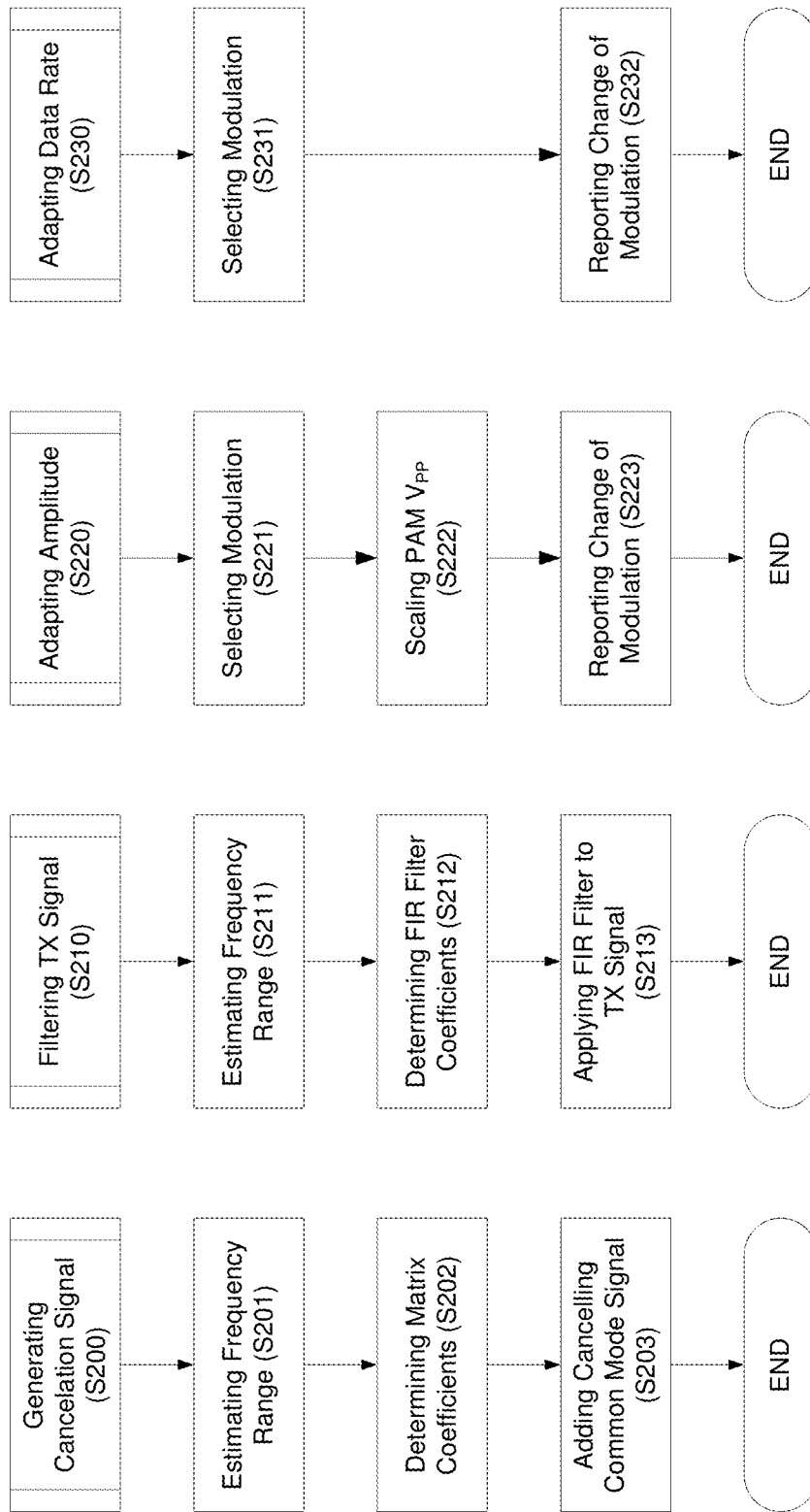

TRANSCEIVER AND METHOD OF ADJUSTING THE TX SIGNAL OF THE TRANSCEIVER FOR WEAKENING EMI

CROSS-REFERENCE TO RELATED APPLICATIONS

This application claims the priority under 35 U.S.C. § 119 of European Patent application no. 17209799.0, filed on Dec. 21, 2017, the contents of which are incorporated by reference herein.

FIELD OF THE INVENTION

The present disclosure relates generally to an Ethernet transceiver and in particular to an electromagnetic emission detection on a communication link and methodologies to reduce the electromagnetic emission.

BACKGROUND

In general, Ethernet is a point-to-point communication technology. More complex networks are created by using layer 2 (according to the ISO/OSI stack) bridges (also called switches). Switches enable the definition of complex network topologies and offer many services including the basic relaying of frames (the basic Ethernet communication element) from one source node to multiple destinations, and more complex operations such as channel bandwidth allocation, network partitioning via virtual LANs (VLANs) and traffic prioritization.

The bandwidth requirements of modern and future automotive applications are posing a relevant challenge to current in-vehicle networking (IVN) technologies such as Controller Area Network (CAN) and FlexRay. Thanks to the latest development of the Ethernet technology, a 100 Mbps Ethernet link can now be implemented and a 1 Gbps link will be available in near future. Switched Ethernet networks are of particular interest in the automotive market for supporting bandwidth-intensive applications such as backbones interconnecting various domains, infotainment and surround-view applications. Usually, Ethernet implementation in the automotive field but not limited thereto the use of unshielded twisted pair of copper wires is preferred because of weight and cost reasons. However, unshielded twisted pair cabling poses problems in meeting EMC (electromagnetic compatibility) requirements, e.g. imposed by regulatory standards.

Since more and more complex electromagnetic environment in an electronic system, electromagnetic interference (EMI) phenomenon is much worse and becomes an obvious obstacle affecting regular operation of the system. Since rapid development of high speed digital circuits, researchers are driven to pay attention to suppress noise and crosstalk of digital system. Ideally, a differential signal may maintain well original signal aspect and maintain low electromagnetic radiation or electromagnetic interference. However, in an actual circuit, unbalanced delay and amplitude, or unbalanced design of input/output register or package layout may cause the differential signal to generate different rising/falling edge time such that unwanted common mode noise attaches the differential signal. With respect to high speed data transmission interface, for instance, Gigabit Ethernet, etc., a cable is always needed to transmit the differential signals between different electronic devices. At this time, a common mode noise may be coupled to an input/output cable and is formed to be an excitation source such that the input/output cable becomes an EMI antenna.

Hence, in order to solve electromagnetic interference (EMI) problem of the input/output cable, it is advantageous to suppress or at least significantly reduce common mode noise on a differential signal route to achieve low electromagnetic emission (EME).

SUMMARY

The present invention provides a transceiver, a system and a method of detecting a common mode signal on a single twisted-pair cable (300) used for bi-directional data communication between a node and a counterpart node of a point-to-point network using differential mode signaling as described in the accompanying claims. Specific embodiments of the invention are set forth in the dependent claims. These and other aspects of the invention will be apparent from and elucidated with reference to the embodiments described hereinafter.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

FIG. 6a schematically illustrates a flow diagram relating to an TX signal adjustment based on active signal cancellation according to an embodiment of the present application;

FIG. 6b schematically illustrates a flow diagram relating to an TX signal adjustment based on TX signal filtering according to an embodiment of the present application;

FIG. 6c schematically illustrates a flow diagram relating to an TX signal adjustment based on TX signal amplitude scaling according to an embodiment of the present application;

FIG. 6d schematically illustrates a flow diagram relating to reporting change to modulation according to an embodiments of the present application;

DETAILED DESCRIPTION

Figure 1:
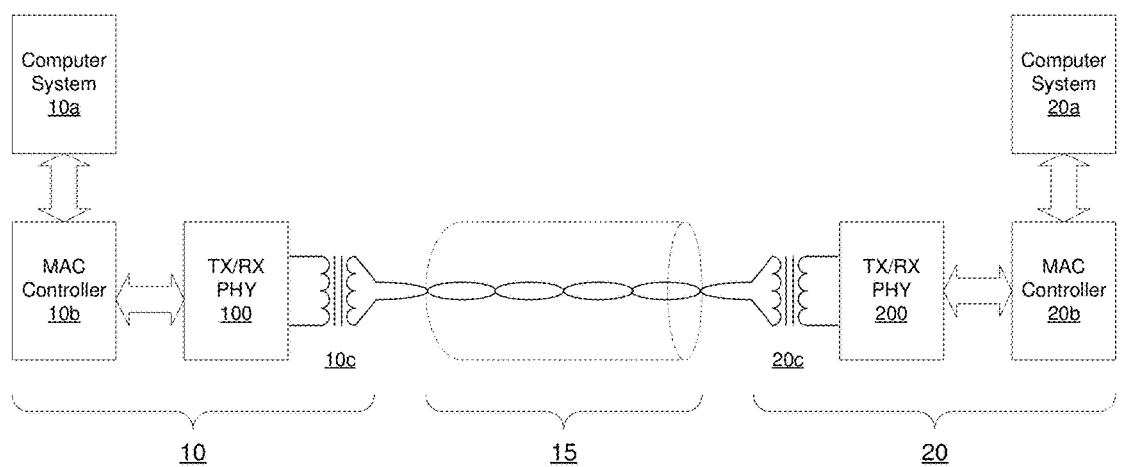
FIG. 1 schematically illustrates a block diagram depicting an Ethernet over twisted-pair cabling link between a first link partner node and a second link partner node in accordance with an embodiment of the present invention.

Embodiments of the present disclosure will be described below in detail with reference to drawings. Note that the same reference numerals are used to represent identical or equivalent elements in figures, and the description thereof will not be repeated. The embodiments set forth below represent the necessary information to enable those skilled in the art to practice the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Referring now to FIG. 1, a block diagram is schematically illustrated, which depicts an Ethernet over twisted-pair cabling link between a first link partner node and a second link partner node in accordance with an embodiment of the present invention.

The exemplary system shown in FIG. 1 comprises a first link partner node 10 and a second link partner node 20. The first link partner node 10 and the second link partner node 20 communicate via a wire-based communication medium 15. In general, the wire-based communication medium 15 may comprise one or more shielded or unshielded twisted-pairs (STP/UTP) of copper cabling or wires, for example. The first link partner node 10 and the second link partner node 20 may communicate using one or more twisted-pair wires comprised within the communication medium 15. Certain performance and/or specifications criteria for STP/UTP copper cabling have been standardized. For example, through IEEE 802.3 Working Groups 100BASE-T1 (IEEE 802.3bw) and 1000BASE-T1 (IEEE 802.3 bp) are specified. In these two standards, a 15 m channel over one unshielded twisted pair of wires is defined for use in particular in vehicles. Both standards also include the parameter definitions for a 40 m transmission channel over one shielded twisted pair of wires for the aforementioned use and/or application such as in trucks, buses, aircraft, and trains, and further in industrial applications.

The first link partner node 10 comprises a computer system 10a, a medium access control (MAC) controller 10b, and a transceiver (TX/RX PHY) 100, which coupled via a hybrid 10c to the wire-based communication medium 15. Similarly, the second link partner node 20 comprises a computer system 20a, a MAC controller 20b, and a transceiver (TX/RX PHY) 200, which coupled via a hybrid 20c to the wire-based communication medium 15. Notwithstanding, the invention is not limited in this regard.

The transceiver (TX/RX PHY) 100 may comprise suitable logic, circuitry, and/or code that may enable communication, for example, transmission of data to and reception of data from a link partner node such as the second link partner node 20. Similarly, the transceiver (TX/RX PHY) 200 may comprise suitable logic, circuitry, and/or code that may enable communication, for example, transmission of data to and reception of data from a link partner node such as the first link partner node 10. The transceivers (TX/RX PHYs) 100 and 200 may support, for example, Ethernet communications operations. The transceivers (TX/RX PHYs) 100 and 200 may enable multi-rate communications, such as 10 Mbps, 100 Mbps, 1000 Mbps (or 1 Gbps) and/or 10 Gbps, for example. In this regard, the transceivers (TX/RX PHYs) 100 and 200 may support standard-based data rates and/or non-standard data rates. Moreover, the transceivers (TX/RX PHYs) 100 and 200 may support standard Ethernet link lengths or ranges of operation and/or extended ranges of operation.

In the context of the present application a link partner node relates to any point-to-point communication link based networking device including in particular any networking Ethernet device such as a networking node, hub, switch, router and the like, which is cable of receiving and transmitting data over the point-to-point communication link.

Reduction of electromagnetic emission (EME) is a major concern in the transmission of electronic signals and data. In particular, in EMI sensitive environments such as automotive environment, reliable operation of for instance high-speed communication requires the observation of electromagnetic compatibility requirements due to the risk of EME caused malfunctions of any kind. In particular, the use of UTP cabling requires further measures.

Common mode chokes are typically used for suppression of electromagnetic interference (EMI), which is an issue on communication links using differential signaling for data communication and in particular in IEEE 802.3 based Ethernet communication links. A common mode choke consists of two independent coils with the same amount of wire loops winding the same magnet, wherein its structure equals to a winding or feed through core coil, and it may generate high conductive impedance for common mode noise and generate impedance approaching to zero for differential signal via high magnetic conductivity by summation and subtraction of self-inductance and mutual inductance.

Figure 2A:
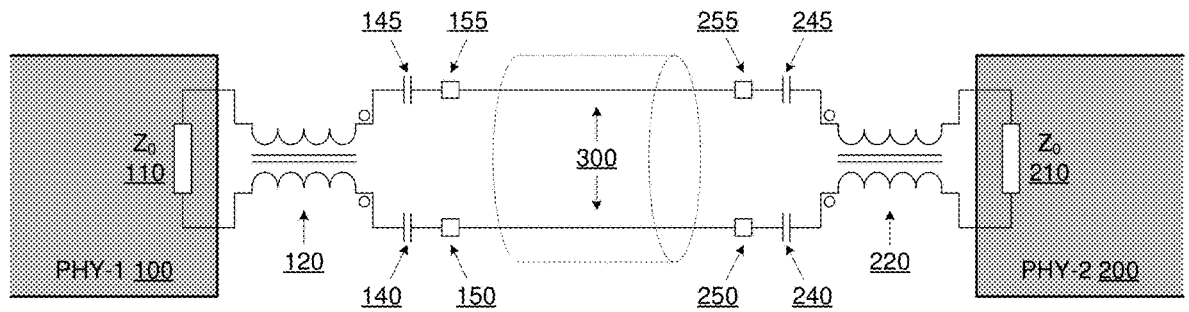
FIGS. 2a and 2b schematically illustrate further block diagrams, each of which depicts an Ethernet over twisted-pair cabling link between a first link partner node and a second link partner node in accordance with an embodiment of the present invention.

Referring now to FIG. 2a, a further block diagram is schematically illustrated, which depicts an Ethernet over twisted-pair cabling link between a first link partner node and a second link partner node in accordance with an embodiment of the present invention. A common mode choke (CMC) 120 and coupling capacitors 140 and 145 are coupled between the signal input/output (I/O) of the transceiver (TX/RX PHY) 100 and the sockets 150, 155 for e.g. detachably receiving a plug of the wire-based communication medium, herein a single twisted-pair cable 300. Similarly, a common mode choke (CMC) 220 and coupling capacitors 240 and 245 are coupled between the signal input/output (I/O) of the transceiver (TX/RX PHY) 200 and the sockets 250, 255 for e.g. detachable receiving a plug of the wire-based communication medium, herein a single twisted-pair cable 300.

Whereas common mode chokes such as those illustrated in FIG. 2a allow for weakening common mode signals received by the transceivers (TX/RX PHYs) 100, 200, common mode signals on the wire-based communication medium, herein a single twisted-pair cable 300 may be nevertheless source of EMI for nearby arranged circuitries.

Figure 2B:
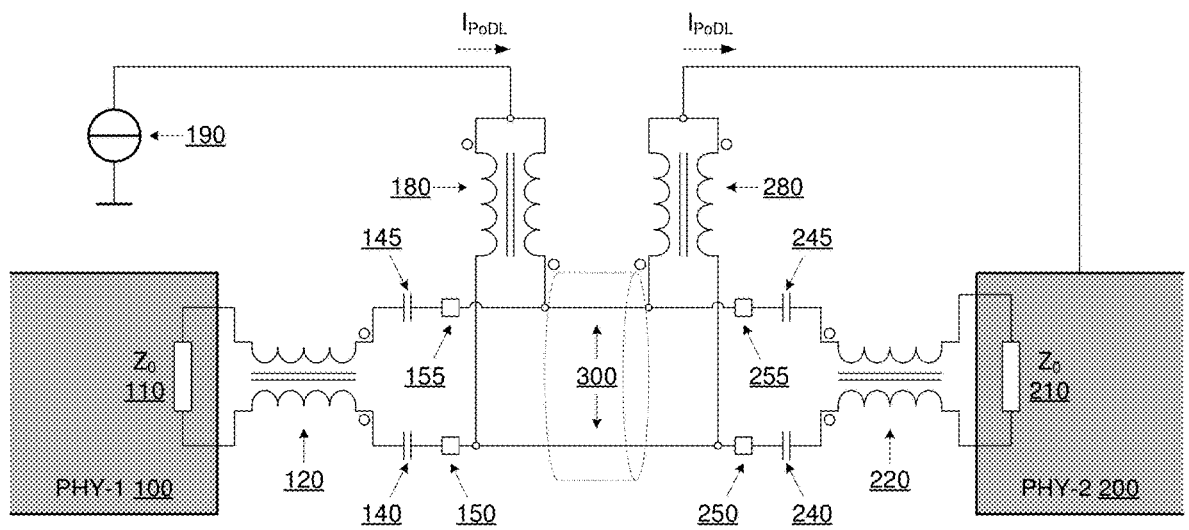

Referring now to FIG. 2b, a yet another block diagram is schematically illustrated, which depicts an Ethernet over twisted-pair cabling link between a first link partner node and a second link partner node in accordance with an embodiment of the present invention. In analogy to the above example of FIG. 2a, the first and second link partner nodes 100 and 200 are provided with common mode chokes (CMC) 120 and 220 for suppression of common mode noise as well as coupling capacitors 140, 145 and 240, 245 for blocking DC signals. In addition, the single twisted-pair cable 300 used as wire-based communication medium between both link partner nodes is applicable and may be used for power transmission. For instance, standard IEEE 802.3bu specifies a power standard analogously to PoE (Power over Ethernet) with the name Power over Data Line (PoDL) over a single-pair Ethernet cable such as the single twisted-pair cable 300.

A direct current is injected into the wires of the single twisted-pair cable 300 using a differential mode choke 180. For instance, the direct current is injected at or near the end of the single twisted-pair cable 300 on side of the first communication partner node 100.

The injected direct current can be drawn from the wires of the single twisted-pair cable 300 using again a differential mode choke 280 connected to the wires of the single twisted-pair cable 300. For instance, the direct current is drawn at or near the end of the single twisted-pair cable 300 on side of the second communication partner node 200. In an example, the direct current transmitted over the single twisted-pair cable 300 supplies the second communication partner node 200 with power.

A differential mode choke consists of two independent coils with the same amount of wire loops winding the same magnet. In contrast to the common mode choke, where currents are flowing in the same direction through each of the independent coils, the currents are flowing in opposite direction through each of the independent coils. The current flow direction is indicated by "dot symbols" shown at the winding symbols of the common/differential mode chokes illustrated in FIGS. 2a and 2b. Hence, a differential mode choke generates high conductive impedance for differential mode signals and common mode signals. A direct current is passed by a differential mode choke, which allows for injecting a direct current into the single twisted-pair cable 300 and drawn a direct current from the single twisted-pair cable 300 with a minimum interference of the data signaling on the single twisted-pair cable 300.

The design and manufacturing of common mode chokes applicable for high frequencies are challenging. In particular, at frequencies above high frequency section of GHz because of frequency characteristic and parasitics of ferromagnetic material, and manufacturing process and complex structure of the common mode choke are difficult to match with the requirements of modern miniaturized circuits. Despite the aforementioned difficulties, well designed transceivers (TX/RX PHY), connectors and cables should meet the defined EMC requirements at design time. But, the EME requirements of the targeted application use may be unknown or only partially known to time of design, which may lead to misassumptions regarding the sufficient margin to emission requirements masks. Furthermore, EMC requirements may be nevertheless missed in different application scenarios and/or different application use because of mode conversion, which in turn may be caused by a lack of channel symmetry and/or cable impedance mismatch. Lack of channel symmetry and/or cable impedance mismatch may be attributed to cable bending, placement of cable connectors, composition of cable harness, a varying distance of the cable to ground and the like. Lack of channel symmetry and/or cable impedance may be also caused by aging effects and/or mechanical and/or thermal stresses (including inter alia vibrations), to which the cable is subjected. The aforementioned list is not exhaustive and should be understood as exemplary in order to improve the understanding of the teaching of the present application.

As the data rate enters the GHz range, crucial problems, such as mode-conversion and signal loss at the differential signal line increase significantly. There may be minimal signal distortion, delay, and skew on carefully designed differential lines. However, an unbalanced structure in the differential interconnection generates undesirable mode-conversion.

Therefore, it is imperative to how to provide further measures to deal with common mode noise, which is utilizable in individual applications during operation.

Figure 3A:
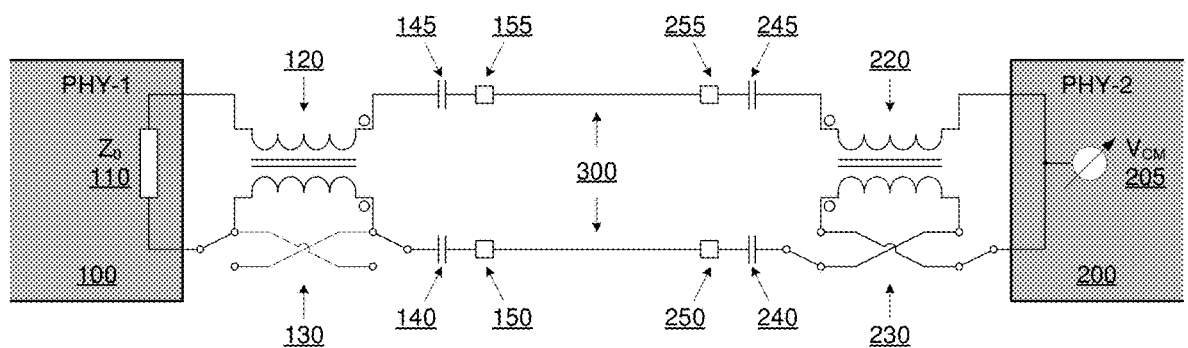
FIGS. 3a to 3c schematically illustrate block diagrams, each of which depicts an Ethernet over twisted-pair cabling link between a first link partner node and a second link partner node with common mode detection in accordance with an embodiment of the present invention.
Figure 3B:
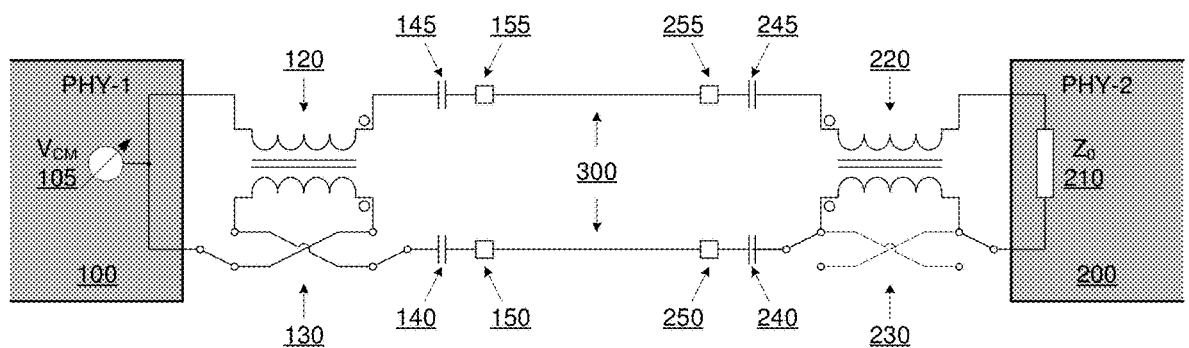

Referring now to FIGS. 3a and 3b, block diagrams are schematically illustrated, each of which depicts an Ethernet over twisted-pair cabling link between a first link partner node and a second link partner node with common mode detection in accordance with an embodiment of the present invention. In order to take measures against common mode noise on a twisted-pair cabling link for Ethernet-based communication, a detection of the common mode noise is required.

The depicted Ethernet over twisted-pair cabling link between a first link partner node and a second link partner node substantially corresponds to the example described above with reference to FIG. 2a but is further modified to allow for common mode signal detection. A repetition of the components common with FIG. 2a will be omitted in the following.

In the current example, a common mode signal detection is suggested, which makes use of the common mode chokes 120 and 220 already present. Each common mode choke 120, 220 is provided with a respective switch arrangement 130 and 230. Each of the switch arrangements 130 and 230 is arranged to selectively switch the common mode choke 120 and the common mode choke 220, respectively, in either common mode signal suppression operation or differential mode signal suppression operation. The designation "common mode choke" should be understood to refer to the (conventional) functionality and operation during data communication. The switching of the common mode choke 120, 220 into differential mode signal suppression operation is for instance obtained by switching the polarity of one coil of the common mode choke 120, 220. Switching the polarity means that in common mode signal suppression operation, currents flows in the same direction through each of the coils/choke windings and that in differential mode signal suppression operation, currents flows in opposite direction through each of the coils/choke windings.

In the example illustrated in FIG. 3a, the switching arrangement 130 is switched such that the common mode choke 120 is operated to suppress common mode signals with respect to the transceiver (TX/RX PHY) 100 and the switching arrangement 230 is switched such that the common mode choke 220 is operated to suppress differential mode signals with respect to the transceiver (TX/RX PHY) 200. For instance, the switching arrangement 230 comprises two switches, which are simultaneously operated to swap the connections to the cable-side and transceiver-side terminals resulting in a reversal of the current flow through one of the coils of the common mode choke 220. This means that the common mode choke 220 is hence switchably wired to pass a common mode signal present on the cable of the communication link 300.

For testing the communication link 300, the transceiver (TX/RX PHY) 100 is arranged and configured to generate and transmit a test signal on the cable of the communication link 300. The test signal may be a differential mode signal. In an example, the test signal is representative of the differential mode signals transferred on the communication link 300 during data communication operation. The test signal may have a frequency range and/or bandwidth, which substantially corresponds to the frequency range of signals transferred on the communication link 300 during data communication operation. In an example, the test signal may comprise a sequence of individual test signals.

As aforementioned, the common mode choke 220 on side of the transceiver (TX/RX PHY) 200 is switchably configured to pass common mode signals only whereas differential mode signals are suppressed. Accordingly, common mode signals occurring on the cable of the communication link 300 due to mode conversion are detectable at the transceiver (TX/RX PHY) 200, which comprises a detection section 205 for detecting common mode signal.

In the example illustrated in FIG. 3b similarly, the switching arrangement 130 is switched such that the common mode choke 120 is operated to suppress differential mode signals with respect to the transceiver (TX/RX PHY) 100 and the switching arrangement 230 is switched such that the common mode choke 220 is operated to suppress common mode signals with respect to the transceiver (TX/RX PHY) 200. For instance, the switching arrangement 130 comprises two switches, which are simultaneously operated to swap the connections to the cable-side and transceiver-side terminals resulting in a reversal of the current flow through one of the coils of the common mode choke 120. This means that the common mode choke 220 is hence switchably wired to pass a common mode signal present on the cable of the communication link 300.

For testing the communication link 300, the transceiver (TX/RX PHY) 200 is arranged and configured to generate and transmit a test signal on the cable of the communication link 300.

As aforementioned, the common mode choke 120 on side of the transceiver (TX/RX PHY) 200 is switchably configured to pass common mode signals only, whereas differential mode signals are suppressed. Accordingly, common mode signals occurring on the cable of the communication link 300 due to mode conversion are detectable at the transceiver (TX/RX PHY) 100, which comprises a detection section 105 for detecting common mode signal.

Those skilled in the art will appreciate from the above examples that the switching arrangements 130 and 230 are provided to enable detection of common mode signal(s) occurring on the cable of the communication link 300 by either one of the link partner nodes 100 and 200 in response to the test signal(s) generated and transmitted on the cable of the communication link 300 by the other one of the link partner nodes 100 and 200. The switching arrangements 130 and 230 are controlled by the transceiver (TX/RX PHY) of the respective link partner node, for instance, in response to a request and/or on detection that the test signal(s) are transmitted on the cable of the communication link 300.

Figure 3C:
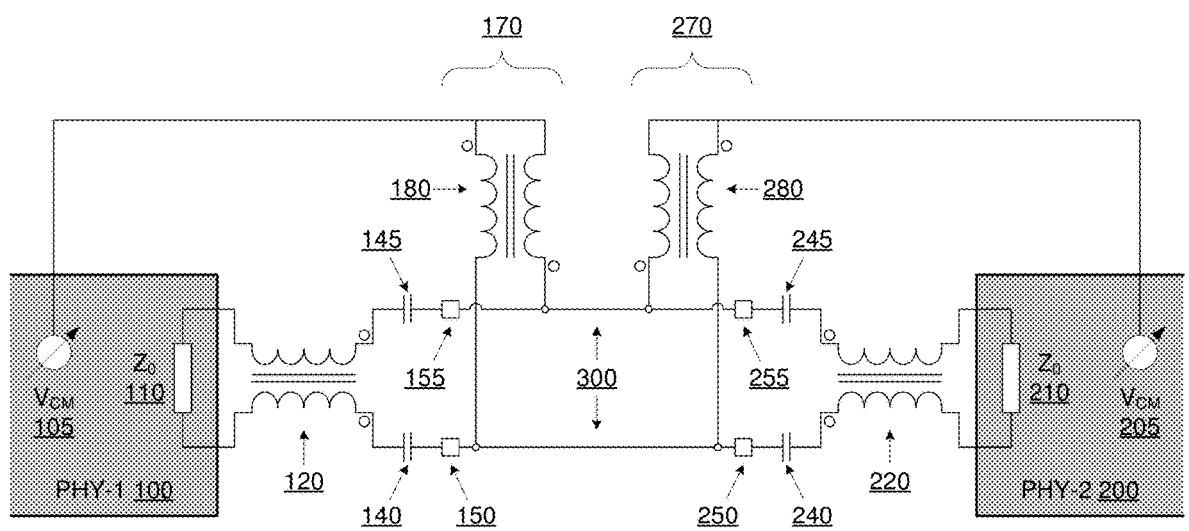

Referring now to FIG. 3c, a block diagram is schematically illustrated, which depicts an Ethernet over twisted-pair cabling link between a first link partner node and a second link partner node with common mode detection in accordance with another embodiment of the present invention. The depicted Ethernet over twisted-pair cabling link between a first link partner node and a second link partner node substantially corresponds to the example described above with reference to FIG. 2b but is further modified to allow for common mode signal detection. A repetition of the components common with FIG. 2b will be omitted in the following.

The differential mode chokes 180 and 280 used for PoDL transmission may be also used for detecting a common mode signal on the cable of the communication link 300. The detection of a common mode signal is performed as aforementioned but without switching the polarity of the common mode chokes 120 and 220 arranged between the respective transceiver (TX/RX PHY) 100 or 200 and the cable of the communication link 300. Instead, the present differential mode chokes 180 and 280 of the PoDL circuits 170 and 270 are used, which are configured to pass direct current signals. Each one of the differential mode chokes 180 and 280 is coupled to a respective one of the detection sections 105 and 205 for detecting common mode signal, which are provided with, coupled to or implemented in the transceivers (TX/RX PHY) 100 and 200.

For instance, the transceiver (TX/RX PHY) 100 transmits a test signal on the cable of the communication link 300. The differential mode choke 280 of the PoDL circuit 270 is arranged and configured to pass the common mode signals present at the cable of the communication link 300 occurring due to mode conversion. The common mode signals present at the cable of the communication link 300 is detectable at the second link partner node 200 by the detection section 205 for detecting common mode signal coupled to the differential mode choke 280.

Similarly, the transceiver (TX/RX PHY) 200 transmits a test signal on the cable of the communication link 300. The differential mode choke 180 of the PoDL circuit 170 is arranged and configured to pass the common mode signals present at the cable of the communication link 300 occurring due to mode conversion. The common mode signals present at the cable of the communication link 300 is detectable at the first link partner node 100 by the detection section 105 for detecting common mode signal coupled to the differential mode choke 180.

Those skilled in the art will understand from the above description that the common mode signals present on the cable of the communication link 300 between two link partner nodes is detected and measured using differential mode chokes, which are provided either by selectively switching the polarity of one of the coils/choke windings of a common mode choke or by a using differential mode choke of a PoDL circuit. The detection section 105 for detecting common mode signal may be arranged at the transceivers (TX/RX PHY) 100, 200 of the link partner nodes such that mutual detection and measurement of common mode signals on the cable of the communication link 300 is possible, which occur in response to a test signal transmitted by the respective other one of the link partner nodes. The suggested methodology of detecting common mode signals on the cable of the communication link 300 may be performed on start-up/boot of the link partner nodes, e.g. as part of the link auto-negotiation procedure during set-up of the communication between the link partner nodes, and/or on demand e.g. in response to the detection of an increasing error rate or a worsening signal to noise ratio on an established communication connection between the link partner nodes. The suggested methodology allows for in situ detection and measurement of common mode signals on the cable of the communication link 300. In particular, the use of differential mode chokes of PoDL circuits may further allow for continuous monitoring the presence of common mode signals on the cable of the communication link 300.

Those skilled in the art will also understand that the differential mode chokes may be arranged at each end of the cable of the communication link 300, which are not part of a PoDL system but for detection of common mode signals on the cable of the communication link 300.

Figure 4A:
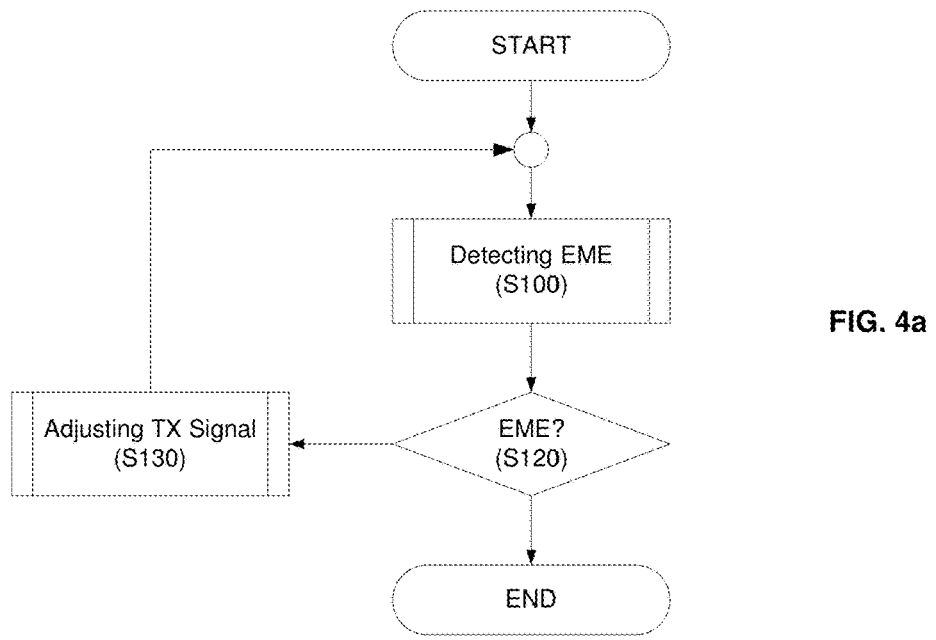
FIG. 4a schematically illustrates a flow diagram of an operation for detecting a violation of electromagnetic emission (EME) requirements on a cable of the communication link and adjusting the communication signals generated by the two link partner nodes communicating over the communication link 300 according to an embodiment of the present application.

Referring now to FIG. 4*a*, a flow diagram is shown, which schematically illustrates an operation for detecting a violation of electromagnetic emission (EME) requirements on a cable of the communication link 300 and adjusting the communication signals generated by the two link partner nodes communicating over the communication link 300 according to an example of the present application. The two link partner nodes communicate data over the communication link using differential signals.

In an operation S100, an electromagnetic emission (EME) present on the cable of the communication link 300 between the connected link partner nodes at the end thereof is detected. In the following, the link partner nodes will be also referred to as nodes, in particular node A and node B corresponding to either one of the aforementioned first link partner node 100 and second link partner node 200. In an example, node A corresponds to the aforementioned first link partner node 100 and node B corresponds to the aforementioned second link partner node 200 In an example, the EME includes common mode signal(s) occurring on the cable of the communication link for instance due to mode conversion.

In an operation S120, the detected EME is compared with an EME threshold. The EME threshold may be predefined. In an example, the EME threshold is an upper threshold to limit the EME.

In case the detected EME exceeds the EME threshold, the EME requirements of the communication link are violated. In this case the transmission (TX) signals are adjusted in order to minimize the detrimental effects of the detected EME to external circuitries in an operation S130. In particular, the transmission (TX) signals are adjusted in order to minimize the common mode signal(s) present on the cable of the communication link thereby reducing EME. Various examples of adjusting the TX signals will be discussed with regard to embodiments of the present application. The success of the adjustment of the TX signals may be verified by returning to operation S110.

In case the detected EME does not exceed the EME threshold, the EME requirements of the communication link are met. A (further) adjustment of the TX signals is not necessary in this case. In an example, it is checked whether an adjustment of the TX signals is advisable to increase the data throughput over the communication link by making use of a margin between detected EME and the EME threshold.

Figure 4B:
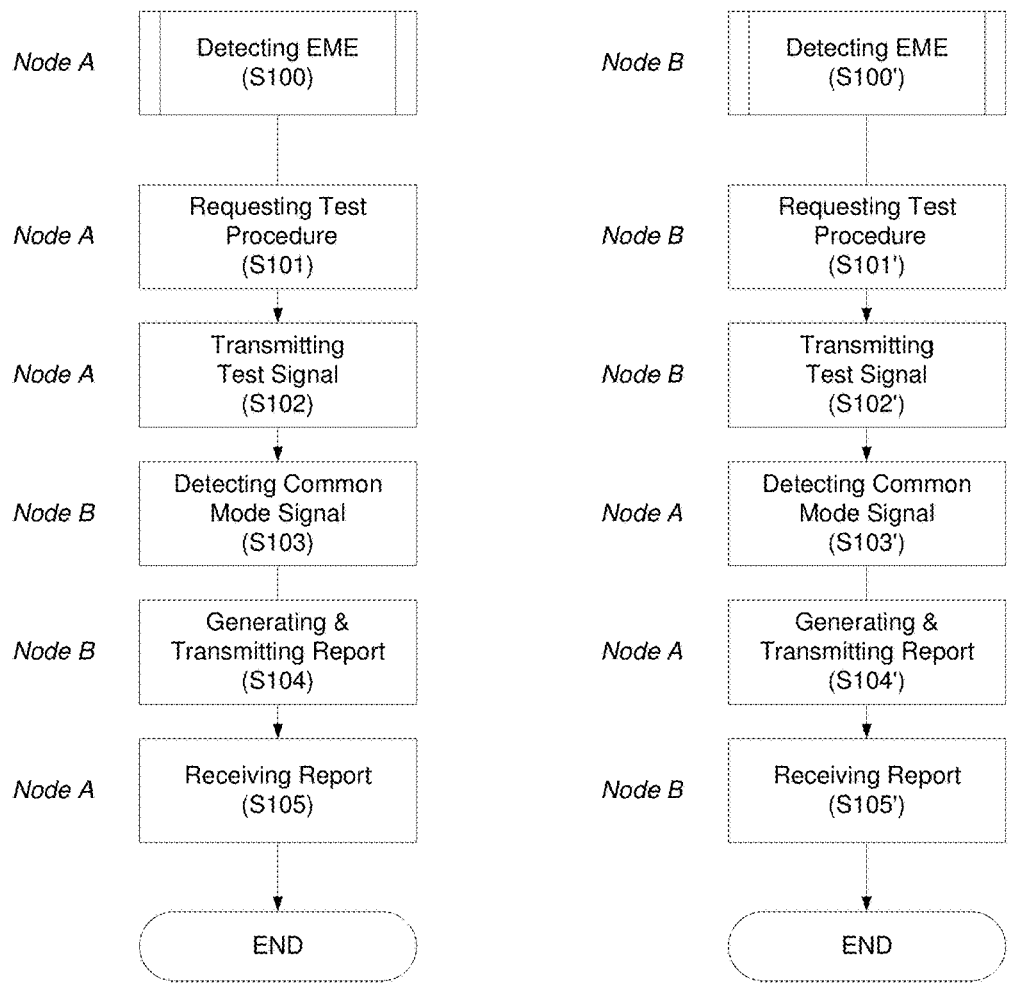
FIG. 4b schematically illustrates flow diagram, relating to a methodology for detecting the electromagnetic emission (EME) on the cable of the communication link according to an embodiment of the present application.

Referring now to FIG. 4*b*, a flow diagram is shown, which schematically illustrates an operation for detecting the electromagnetic emission (EME) on the cable of the communication link 300 according to an embodiment of the present application. The present embodiment is based on a reporting of the detection results from one node to the other node connected to the cable of the communication link.

In an operation S101, node A transmits a request to node B, which requests the initiation of the EME test procedure. In response to the request, node B prepares for performing the EME test procedure.

In a following operation S102, node A transmits a test signal on the cable of the communication link 300 to node B.

In a following operation S103, node B performs a detecting of a common mode signal, which may occur in response to the transmitted test signal. Node B is prepared by the initial request for detecting the common mode signal. The detection is performed by node B as described above with reference to FIG. 3. For instance in response to the above request for preparation, node B is configured to switch the polarity of the common mode choke 230 as illustrated in FIG. 3*a* and described above with reference thereto. Alternatively, node B is configured to make use of a differential mode choke such as differential mode choke 280 shown in FIG. 3*c* and described above with reference thereto.

In a following operation S104, node B generates a report on the detection of the common mode signal and transmits the report to node A.

In a following operation S105, node A receive the report from node B. Based on the received report, node A is now capable of adjusting TX signals in order to minimize the detected EME if necessary.

Those skilled in the art immediately understand from the above description that the same or similar procedure is applicable to enable node B to be informed about the EME present on the cable of the communication link as schematically illustrated by the flow diagram and the operations S100' to S105'. In brief, node B transmits the test signal (S101'), node A performs (S103') a detecting of a common mode signal, which may occur in response to the transmitted test signal (for instance by switching the polarity of the common mode choke 130 as shown in FIG. 3*b* or using differential mode choke 180 shown in FIG. 3*c*), and node A generates (S104') and transmits the report on the common mode signal detection to node B, which receives (S105') the report and is enabled for adjusting TX signals.

Those skilled in the art will understand that the test signal referred to above is a differential mode signal and in particular an easily recognizable differential mode signal including for instance a narrow band test signal, a test signal with a predefined modulation scheme including a predefined frequency modulation (FM), pulse modulation (PM) or code sequence or a test signal with a predefined direct sequence spread spectrum (DSSS). The test signal may have other easy to recognize signal characteristic, which in particular differentiates the test signal from noise or interference signals caused by one or more external EMI sources.

Those skilled in the art will also understand that the test signal referred to above trigger the performing of detecting a common mode signal on the cable of the communication link 300 wherein the request transmitted from the test signal generating and transmitting node to the counterpart node (cf. operations S101 and S111) may be omitted. To enable using the test signal to trigger the performing of the common mode signal detection, the test signal should be detectable distinct from data communication related signals on the cable of the communication link. A test signal detector may be part of a RX section of the transceivers of the link partner nodes, examples of which are discussed in the following.

Figure 5A:
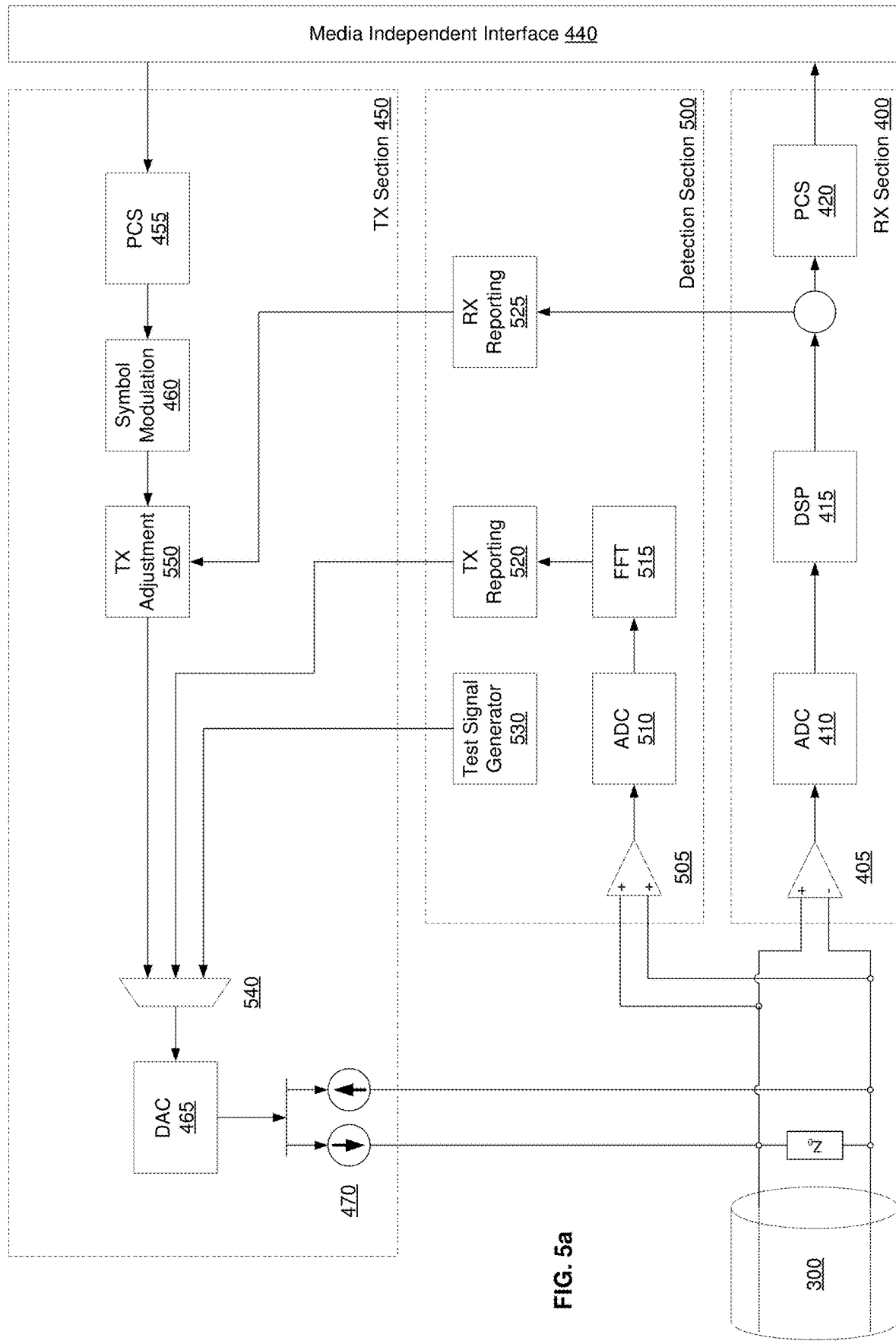
FIGS. 5a and 5b schematically illustrate block diagrams, each of which relates to an implementation of a transceiver (TX/RX PHY) of a link partner node according to an embodiment of the present application.

Referring now to FIG. 5a, a block diagram of a transceiver (TX/RX PHY) of a link partner node according to an embodiment of the present application is schematically illustrated.

The transceiver (TX/RX PHY) comprises a receiving (RX) section 400 and a transmitting (TX) section 450. The RX section comprises typically an RX analog frontend, herein schematically illustrated by an amplifier 405 and an analog-to-digital converter (ADC) 410, and a digital processing stage, herein schematically illustrated by a digital signal processor 415 and a physical code sublayer component 420. The digital processing stage is configured to process signals, which are received from the communication link 300, for being passed to the Media Access Control (MAC) layer (not shown) via the media independent interface (MII) 440. The TX section 450 comprises typically a digital processing stage, herein schematically illustrated by a physical code sublayer component 455 and a symbol modulation component 460 and an TX analog frontend, herein schematically illustrated by a digital-to-analog converter (DAC) 465 and a driver stage 470. The implementation of the RX section 400 and TX section 450 is known in the art and a skilled person understands that further components may be comprised in the RX section 400 and TX section 450.

For common mode detection, a detection section 500 is further comprised in the illustrated transceiver (TX/RX PHY), which includes an amplifier 505, an analog-to-digital converter (ADC) 510 and a transform component 515 for transforming the digitized signal into frequency domain such as a Fast Fourier transform component 515. Those skilled in the art will understand that the detection of a common mode signal on the cable of the communication link 300 may include further processing steps such as demodulation, decoding and de-spreading, which is typically performed on the digitized signal. Mode conversion is frequency dependent. Conventionally, there is more mode conversion at higher frequencies. The frequency transform component 515 allows to analyze strength of the detected common mode signal with respect to a frequency range, which is in particular predefined by the transform component.

In accordance with the operation according to the embodied flow diagram of FIG. 4b, the results of the common mode signal detection, herein the frequency transformed version of the detected common mode signal, is reported to the counterpart node. For reporting, the detection section 500 comprises a TX reporting component 520, which is configured to generate the report and to supply the report to the TX section 450 of the transceiver (TX/RX PHY) for being transmitted to the counterpart node. In the example shown in FIG. 5a, the TX reporting component 520 directly injects the report into the TX section 450 of the transceiver (TX/RX PHY).

The detection section 500 further comprises a test signal generator 530, which is provided to supply a test signal to the TX section 450 of the transceiver (TX/RX PHY) and a RX reporting component 525, which is configured to receive a common mode signal detection report generated by the counterpart node and to provide the detection results to a TX signal adjustment component 550. In the example shown in FIG. 5a, the test signal generator 530 directly injects the test signal into the TX section 450 of the transceiver (TX/RX PHY). In the example shown in FIG. 5a, the RX reporting component 525 taps the received report at the RX section 400 of the transceiver (TX/RX PHY).

For the sake of illustration of the functionality and operation of the transceiver (TX/RX PHY) with EME detection capability, choke arrangements as described with reference to FIGS. 3a to 3c are omitted in the block diagram. However, those skilled in the art understand that in particular the detection of the common mode signal requires one of the aforementioned choke arrangements and/or control thereof.

Figure 5B:
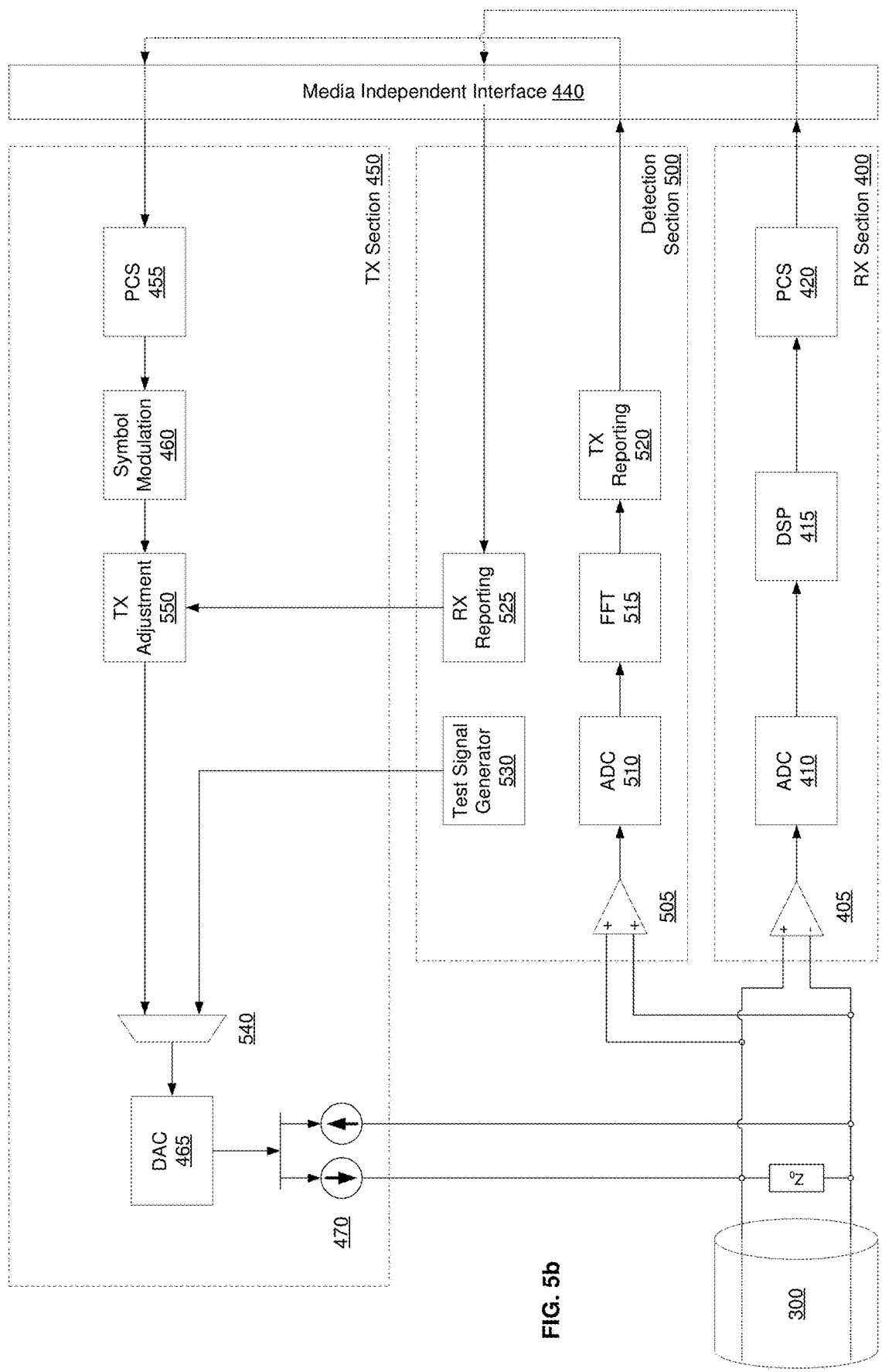

Referring now to FIG. 5b, a block diagram of a transceiver (TX/RX PHY) of a link partner node according to another embodiment of the present application is schematically illustrated.

The transceiver (TX/RX PHY) of FIG. 5b substantially corresponds to the above described one but the TX reporting component 520 and the RX reporting component 525 make use of one or more higher layers such as the medium access control (MAC) layer accessible via the media independent interface 440 for transmitting and receiving the reports exchanged between node A and node B as described above with reference to FIG. 4b.

Whereas the detection of EME and common mode signals on the cable of the communication link has been discussed in detail in the forgoing description, the following description relates to the adaptation of the TX signal in response to the results of the detection operation.

Figure 7A:
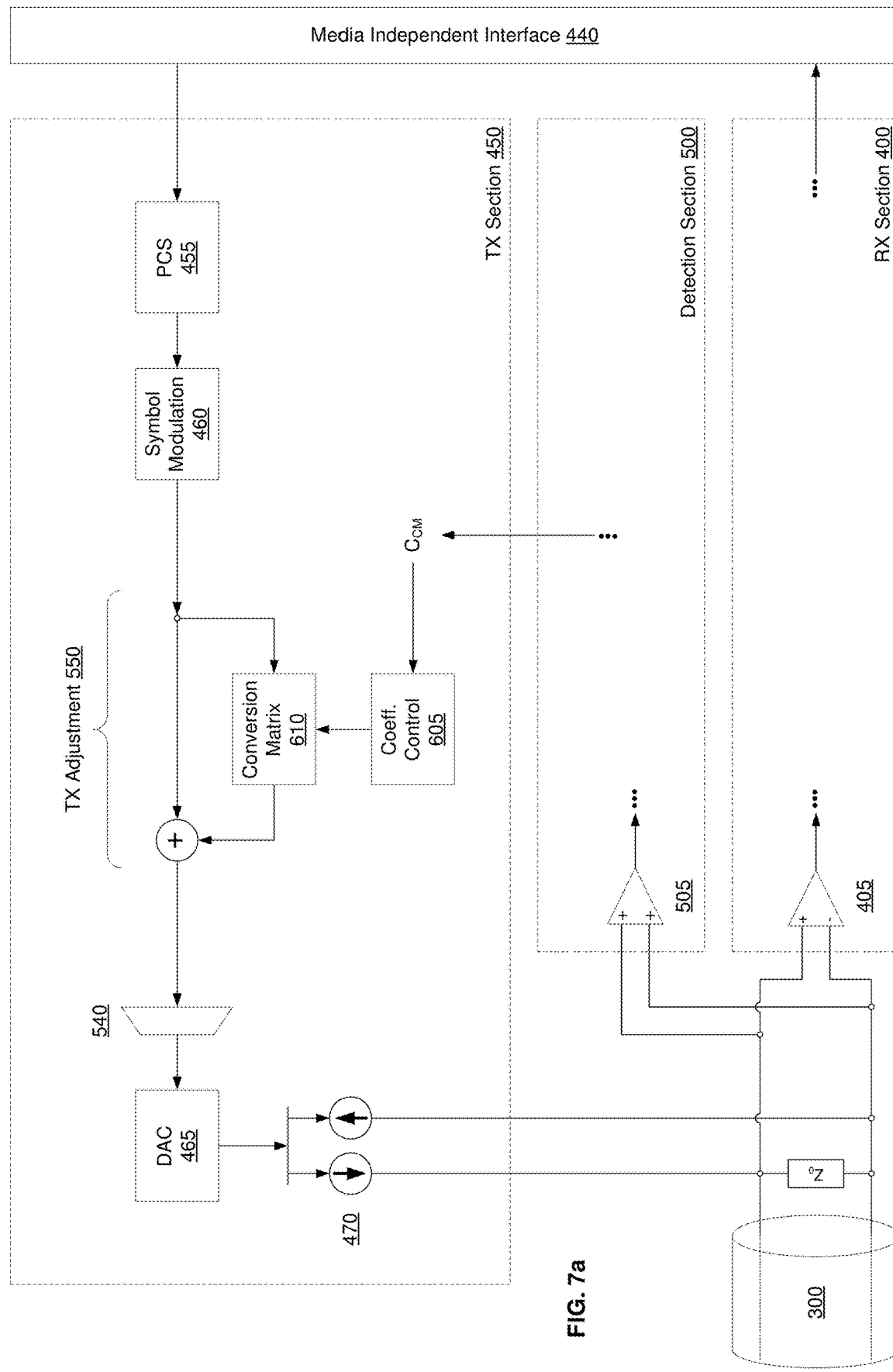
FIG. 7a shows a block diagram schematically illustrating an TX signal adjustment based on adding of an inverse or cancelling signal in the transmit path of the transmit section of a transceiver (TX/RX PHY) of a link partner node according to an embodiment of the present application.
Figure 7B:
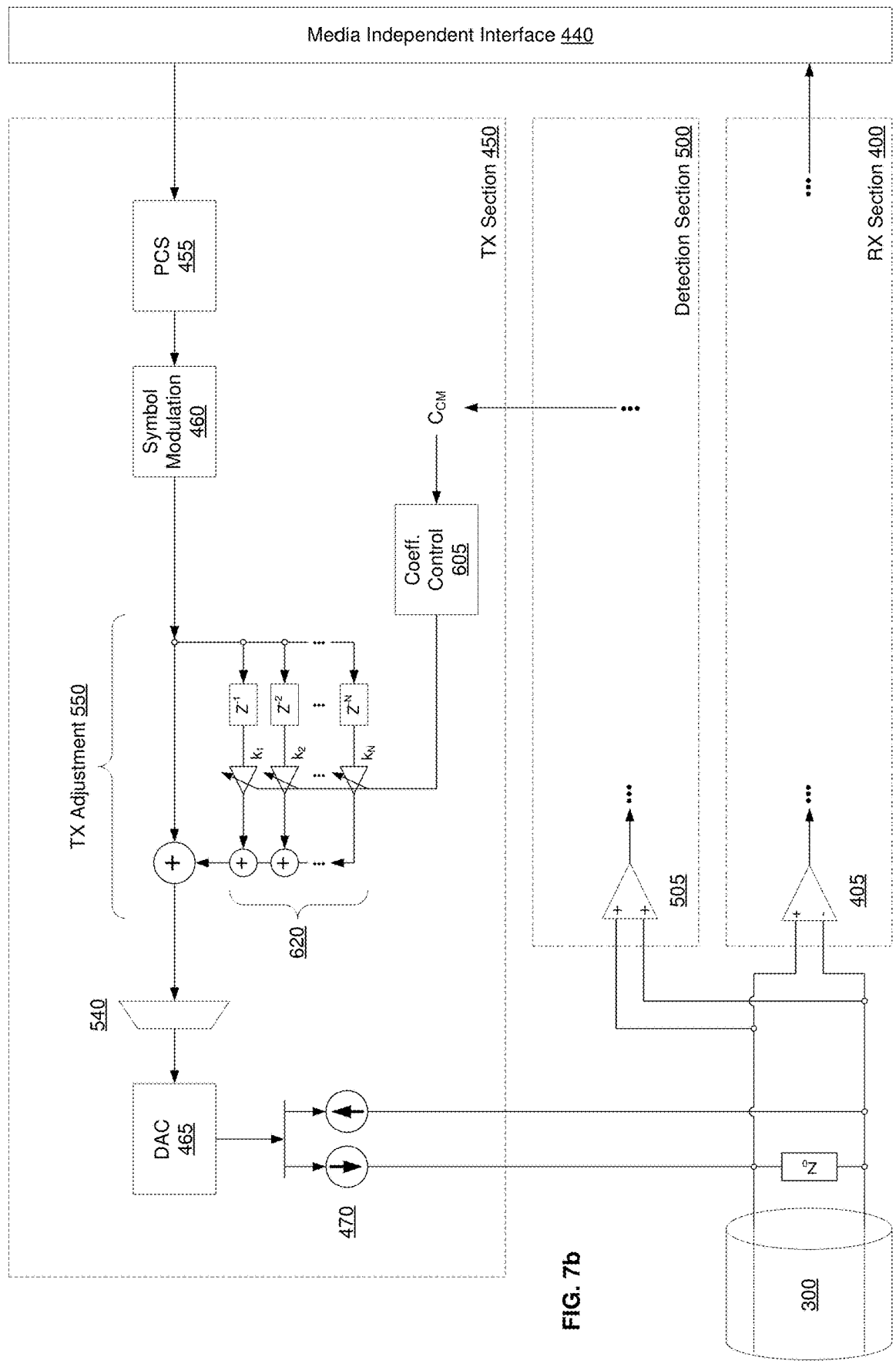
FIG. 7b shows a block diagram schematically illustrating an TX signal adjustment based on filtering the TX signal on the transmit path of the transmit section of the transceiver (TX/RX PHY) of a link partner node according to an embodiment of the present application.
Figure 7C:
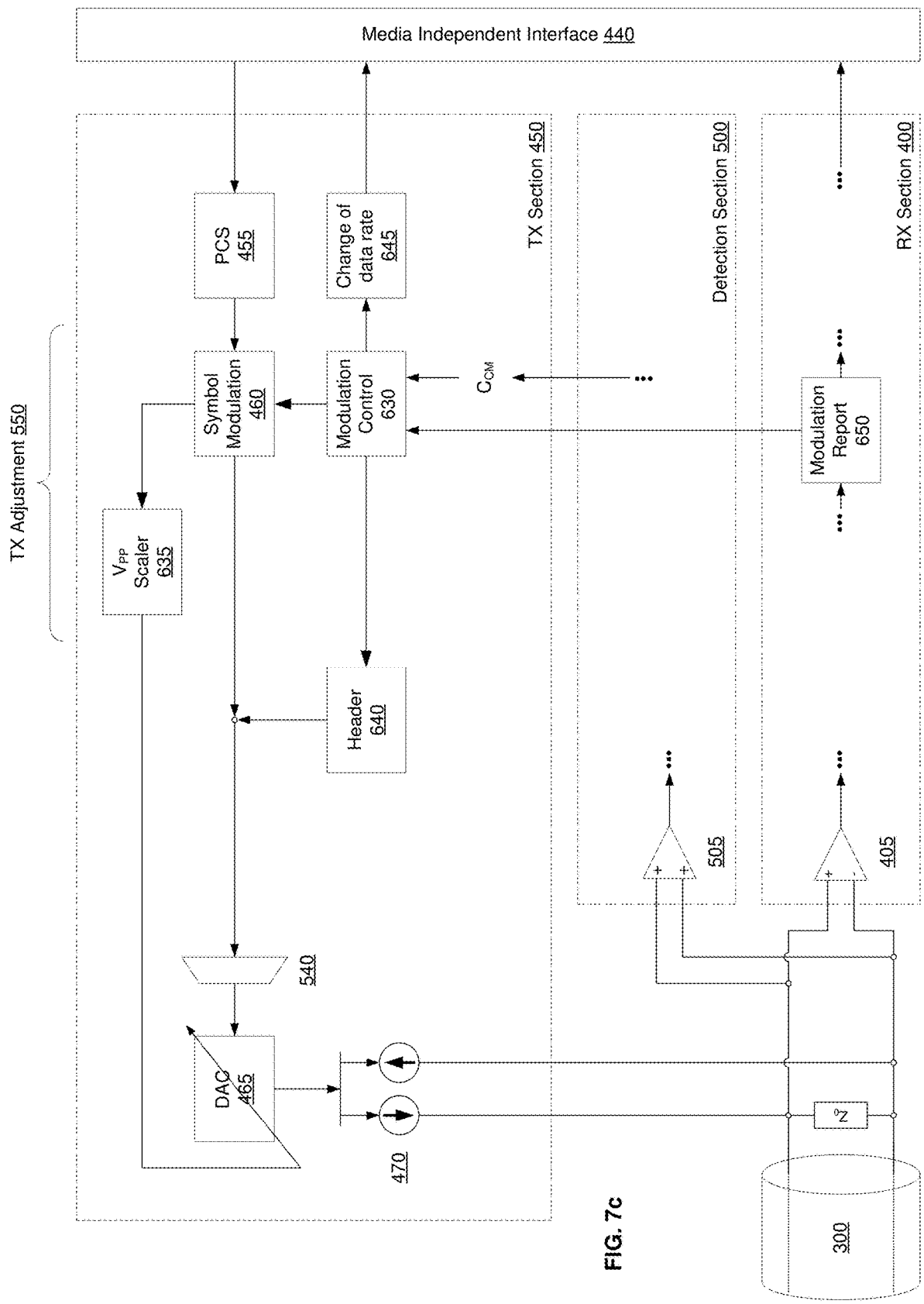
FIG. 7c shows a block diagram schematically illustrating an TX signal adjustment based on scaling the amplitude of the TX signal on the transmit path of the transmit section of a transceiver (TX/RX PHY) of a link partner node according to an embodiment of the present application.

With respect to FIGS. 6a to 6c different TX signal adaptation procedures will be described in conjunction with FIGS. 7a to 7c showing exemplary implementations in the transceiver (RX/TX PHY) enabling the different TX signal adjustment procedures.

Referring now to FIG. 6a, a flow diagram is shown, which schematically illustrates an TX signal adjustment based on signal cancellation according to an embodiment of the present application.

The signal cancellation procedure S200 relates to a cancelling of the common mode signal with effect to the counterpart node, which receives data communication signals, using an inverse or cancelling signal generated at the transmitting node. The inverse or cancelling signal is generated on the basis of the detection result of a previous EME detection as described above.

In an operation S201, a frequency range of the detected common mode signal is estimated. In particular, the frequency range is estimated on the basis of the frequency transformed common mode signal. More particular, the frequency domain coefficients, which may be Fourier coefficients, obtained by frequency transform of the real space common mode signal are compared with one or more thresholds, which may be predefined. The frequency range is estimated from frequency domain coefficients exceeding the one or more thresholds.

Based on the estimated frequency range, matrix coefficients of an inverse mode conversion matrix are determined and the inverse mode conversion matrix is fed with the determined matrix coefficients in an operation S202.

In an operation S203, the inverse mode conversion matrix is operated to generate an inverse or cancelling signal and to add the generated inverse/cancelling signal to a TX signal generated at the TX section 450 of the transceiver (TX/RX PHY). The inverse mode conversion matrix is provided to generate the inverse/cancelling signal based on the TX signal generated by the transceiver (TX/RX PHY). The inverse/cancelling signal generated by the inverse mode conversion matrix is a common mode signal. The inverse mode conversion matrix effectively adds a deliberate (inverse) common mode signal to the output signal of the transceiver (TX/RX PHY), which is substantially in anti-phase to the detected common mode signal thereby cancelling or at least weakening the detected common mode signal.

Due to the large common mode suppression of the common mode choke at the output of the transceiver (TX/RX PHY), the inverse/cancelling signal generated by the inverse mode conversion matrix has to be strong to overcome the suppression. For example, it may be assumed that the cable of the communication link is 10% unbalanced due to some impairment. The differential mode signal has for instance 1 mVrms (=+60 dBuV) for one or more EMC relevant frequency ranges/bands (e.g. 100 MHz). The unbalance of 10% results to a common mode signal on the cable with +40 dBuV, which is out of a predefined specification (e.g. >20 dB for IEEE 802.3). A cancelling or at least weakening of the common mode signal can be expected in case of an inverse/cancelling signal with +40 dBuV in anti-phase after passing the common mode choke arranged at the output of the transceiver (TX/RX PHY). It may be assumed that the common mode choke has a +40 dB common mode signal suppression. Hence, the inverse/cancelling signal requires 10 mVrms (=+80 dBuV) at the transceiver (TX/RX PHY). This means that the inverse/cancelling signal has to be a factor of 10 stronger than the differential mode signal generated at the transceiver (TX/RX PHY) for communicating data over the cable of the communication link. A typical target for cancelling the common mode signal is a remaining common mode signal, which is smaller than −40 dB and an emission target smaller than +15 dBuV.

Referring now to FIG. 7a, a block diagram is shown, which schematically illustrates an TX signal adjustment based on the adding of an inverse/cancelling signal in the transmit path of the transmit section of a transceiver (TX/RX PHY) according to an embodiment of the present application. Those skilled in the art will immediately appreciate that the block diagram of FIG. 7a has been simplified to the components involved in generating and adding of the inverse/cancelling signal. The description of the aforementioned embodiments of the transceiver (TX/RX PHY) should be read into the present embodiment.

The frequency transform coefficients may be provided by the frequency transform component (e.g. the FFT component 515) or the RX reporting component 525 to a coefficient control component 605, which is arranged to estimate the frequency range, to determine the matrix coefficients for an inverse mode conversion matrix component 610 arranged in form of a filter in the transmit path of the transceiver (TX/RX PHY), and to configure the inverse mode conversion matrix component 610 with the determined matrix coefficients. An input of the inverse mode conversion matrix component 610 is coupled to the transmit path of the TX section 450 to receive the TX signal generated by the transceiver (TX/RX PHY) and an output of the inverse mode conversion matrix component 610 is coupled to the signal coupler, which is provided to add the inverse/cancelling signal generated by the inverse mode conversion matrix component 610 to the TX signal on the transmit path of the TX section 450.

The inverse/cancelling signal is added to the TX signal generated by the transceiver (TX/RX PHY) upstream to the digital-to-analog converter (DAC) 465 and in particular directly upstream to the digital-to-analog converter (DAC) 465.

Referring now to FIG. 6b, a flow diagram is shown, which schematically illustrates an TX signal adjustment based on filter according to an embodiment of the present application.

The signal cancellation procedure S210 relates to a FIR filter, which is applied for frequency selective filtering the TX signal generated by the transceiver (TX/RX PHY) at the node. The filter coefficients, with which the FIR filter is configured, are generated on the basis of the detection result of a previous EME detection as described above.

In an operation S211, a frequency range of the detected common mode signal is estimated. In particular, the frequency range is estimated on the basis of the frequency transformed common mode signal. More particular, the frequency domain coefficients (Fourier coefficients) obtained by frequency transform of the real space common mode signal are compared with one or more thresholds, which may be predefined. The frequency range is estimated from frequency domain coefficients exceeding the one or more thresholds.

Based on the estimated frequency range, filter coefficients of an FIR filter are determined and the FIR filter is fed with the determined filter coefficients in an operation S202. The FIR filter is in particular a band stop FIR filter and the filter coefficients are determined to weaken the TX signal at the estimated frequency range, where the frequency domain coefficients of the detected common mode signal exceeds the one or more thresholds.

Typically, the TX signals transmitted on the cable of the communication link 300 have to comply with a predefined TX PSD (power spectral density) mask. The TX PSD mask may include a lower PSD mask and an upper PSD mask, which define a corridor for the strength of the TX signals. The predefined TX PSD mask is typically defined in a standard to enable interoperability of transceivers (TX/RX PHY). The fact that the signal strength should comply with predefined TX PSD (power spectral density) mask allows for using a band stop FIR filter configured on the basis of the detected common mode signal for weakening the detected common mode signal.

In an operation 213, the FIR filter is operated to frequency dependent weaken the TX signal generated at the TX section 450 of the transceiver (TX/RX PHY).

Referring now to FIG. 7b, a block diagram is shown, which schematically illustrates an TX signal adjustment based on filtering the TX signal on the transmit path of the transmit section of a transceiver (TX/RX PHY) according to an embodiment of the present application. Those skilled in the art will immediately appreciate that the block diagram of FIG. 7b has been simplified to the components involved in filtering the TX signal. The description of the aforementioned embodiments of the transceiver (TX/RX PHY) should be read into the present embodiment.

The frequency transform coefficient may be provided by the frequency transform component (e.g. the FFT component 515) or the RX reporting component 525 to a coefficient control component 605, which is arranged to estimate the frequency range, to determine the filter coefficients for a FIR filter component 620 in the transmit path of the transceiver (TX/RX PHY), and to configure the FIR filter component 620 with the determined filter coefficients. An input of the FIR filter component 620 is coupled to the transmit path of the TX section 450 to receive the TX signal generated by the transceiver (TX/RX PHY) and an output of the FIR filter component 620 is coupled to the signal coupler, which is provided to add the filter signal generated by the FIR filter component 620 to the TX signal on the transmit path of the TX section 450. Effectively, the FIR filter component 620 is configured to operate as a band stop filter and to weaken the TX signal at the estimated frequency range.

The TX signal generated by the transceiver (TX/RX PHY) is filtered by the FIR filter component 620 upstream to the digital-to-analog converter (DAC) 465 and in particular directly upstream to the digital-to-analog converter (DAC) 465.

Figure 8A:
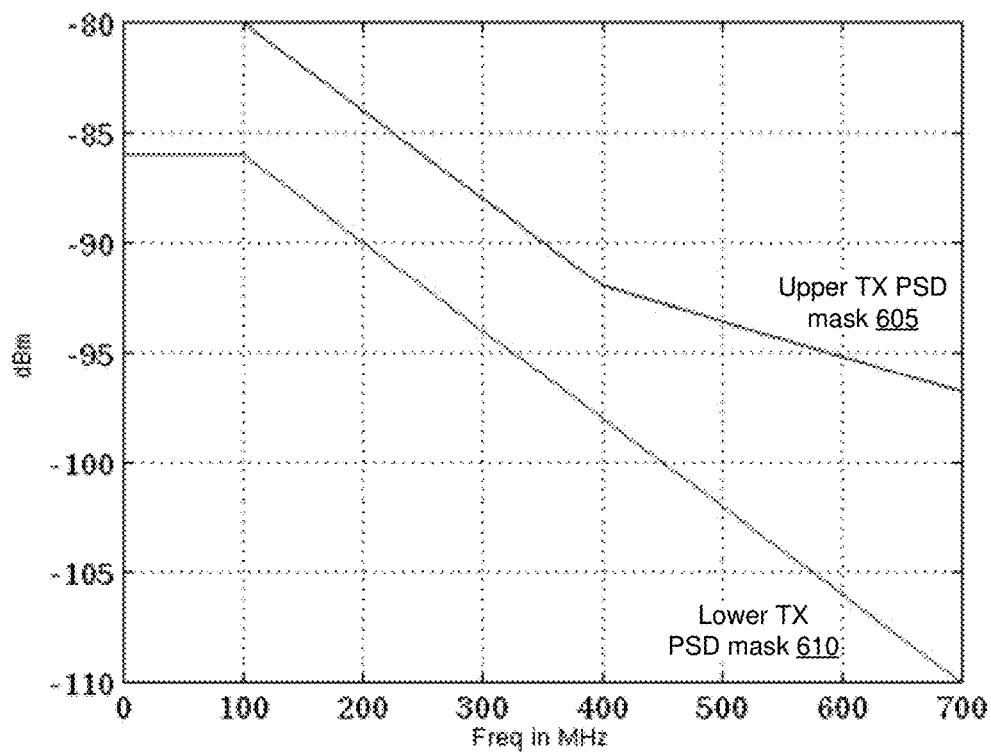
FIGS. 8a and 8b show schematic diagrams illustrating upper and lower transmission Power Spectral Density, TX PSD, masks according to examples of the present application.
Figure 8B:
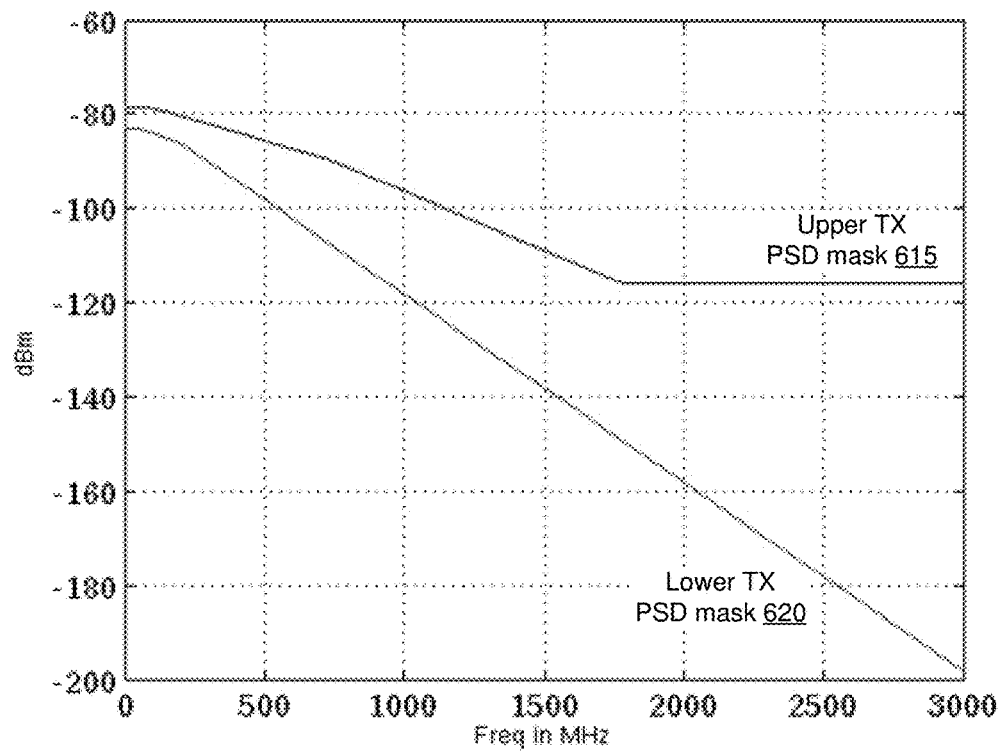

The upper and lower TX PSD masks 605 and 610 for a 1000BASE-T1 communication link and upper and lower TX PSD masks 615 and 620 for a 10 GBASE-T is illustrated in FIGS. 8a and 8b, respectively. As understood from the illustrated upper and lower TX PSD mask, there is for instance a 6 dB headroom available for shaping the TX-PSD through filtering the TX signal as described above.

Referring now to FIG. 6c, a flow diagram is shown, which schematically illustrates an TX signal adjustment based on amplitude scaling according to an embodiment of the present application.

The amplitude scaling procedure S220 involves a configurable pulse amplitude modulation (PAM), which is used for modulating the TX signal at the TX section 450 of the transceiver (TX/RX PHY). In PAM signal modulation, information is encoded in the amplitude of a series of signal pulses. For example, a two-bit modulator takes two bits and maps the signal amplitude to one of four possible voltage (amplitude) levels (perhaps 0.5 V, 1 V, 1.5 V, 2 V) over a specified symbol period. Demodulation of the signal is accomplished by detecting the amplitude level of the carrier at each symbol period. The number of discrete pulse amplitude levels are typically some power of two for digital signal communication and are referred to as PAM level or modulation complexity. Lower modulation complexity means lower PAM level and higher complexity means higher PAM level.

For instance, 4-level PAM (PAM-4) uses 4 discrete pulse amplitude levels, each of which is referred to as one of 4 symbols enabling symbol mapping of a 2 Bit sequence; 8-level PAM (PAM-8) uses 8 discrete pulse amplitude levels, each of which is referred to as one of 8 symbols enabling symbol mapping of a 3 Bit sequence; 16-level PAM (PAM-16) uses 16 discrete pulse amplitude levels, each of which is referred to as one of 16 symbols enabling symbol mapping of a 4 Bit sequence and so on. Generally, an amplitude level range comprises the discrete pulse amplitude levels. The upper limit of the amplitude level range corresponds to a predefined maximum modulation amplitude. When maintaining the maximum modulation amplitude, the step size between adjacent pulse level amplitudes is hence a function of the PAM level (or number of symbols). For instance, a PAM level is selected to ensure that the smallest pulse amplitude level is above the noise floor. In case of an increasing noise floor, while maintaining the maximum modulation amplitude a selecting of a lower PAM level, which increases the step size between consecutive pulse level amplitudes, allows for ensuring that the smallest pulse amplitude level is above the increased noise floor.

Figure 9:
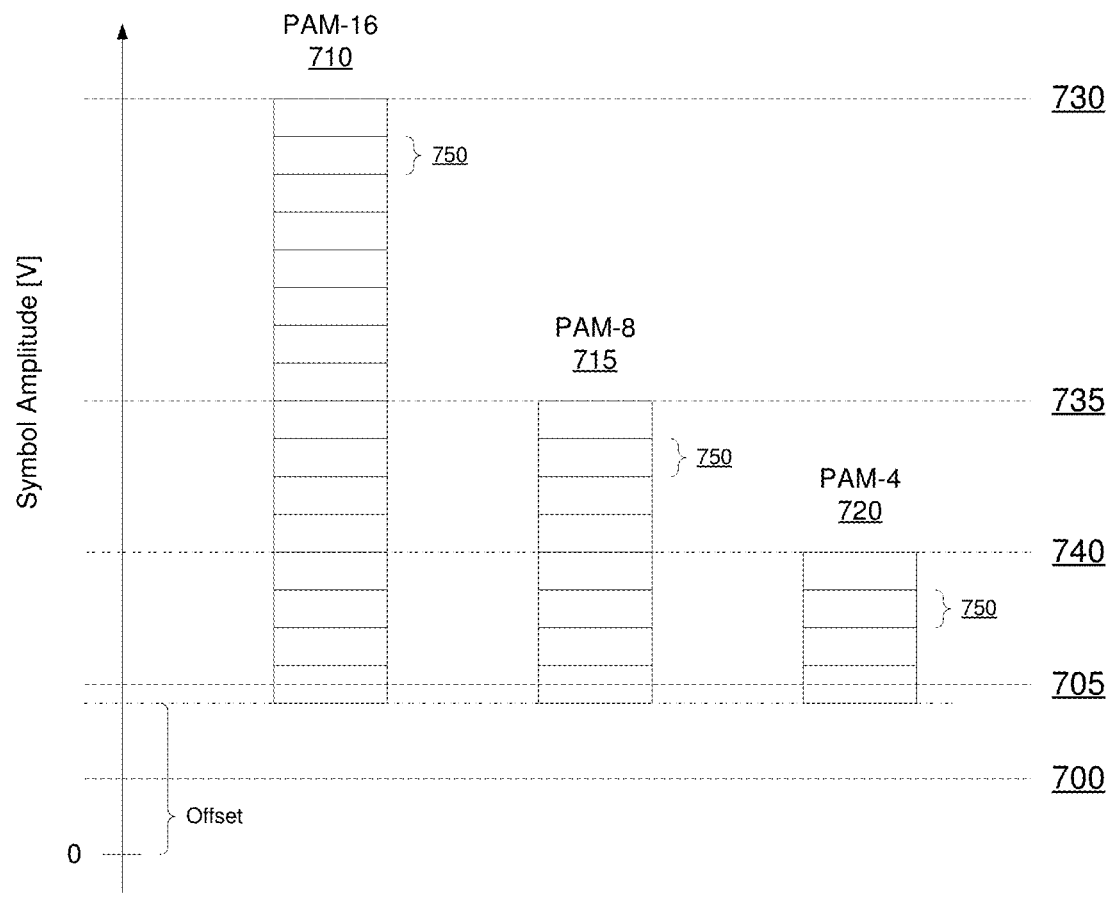
FIG. 9 schematically illustrates a block diagram of discrete amplitude levels of exemplary pulse amplitude modulation schemes.

Referring now to FIG. 9, a schematic diagram illustrates discrete amplitude levels of exemplary pulse amplitude modulation schemes, namely PAM-16, PAM 8 and PAM 4 with amplitude scaling. The discrete amplitude levels of the different PAM schemes are illustrated in form of overlying bars 710, 715 and 720. PAM-16 has 16 distinct discrete amplitude levels, PAM-8 has 8 distinct discrete amplitude levels and PAM-4 has 4 distinct discrete amplitude levels.

The diagram further schematically illustrates the noise floor 700 due to analog-to-digital conversion (including quantization noise and thermal noise) and the noise floor 705 due to cross-talk effects. In order to reduce the EME, an amplitude scaling is suggested, which downscales the maximum modulation amplitude dependent on the complexity of the amplitude modulation. A maximum modulation amplitude is predefined with respect to a default amplitude modulation scheme. The amplitude scaling hence applies accordingly to the discrete pulse amplitude levels comprised by the aforementioned amplitude level range.

The amplitude scaling is enabled by selecting a new amplitude modulation scheme with a smaller number of symbols, e.g. a lower PAM level. The downscaling of the maximum modulation amplitude is a function of the default amplitude modulation scheme and the new amplitude modulation scheme. In particular, the downscaling of the maximum modulation amplitude is a function of the numbers of symbols of the default amplitude modulation scheme and the new amplitude modulation scheme. For instance, the maximum modulation amplitude is downscaled by a factor corresponding to the ratio of the numbers of symbols of the default amplitude modulation scheme and the new amplitude modulation scheme. For instance, the maximum modulation amplitude may be downscaled by changing the modulation scheme from PAM-16 to PAM-8 as schematically illustrated in FIG. 9. The ratio of the PAM levels (or ratio of numbers of symbols) is equal to 2. The new maximum amplitude is half ($\frac{1}{2}$) of the predefined maximum modulation amplitude of the default amplitude modulation scheme. The downscaling factor is equal to the ratio of the PAM levels. The downscaling factor provides for the same step size between consecutive pulse level amplitudes in case of the PAM-16 scheme to PAM-8 scheme. In another example, the maximum modulation amplitude may be downscaled by changing the modulation scheme from PAM-16 to PAM-4. In this example, the ratio of the PAM levels (or ratio of numbers of symbols) is equal to 4, in accordance with which the maximum modulation amplitude is accordingly downscaled. The new maximum amplitude is half ($\frac{1}{4}$) of the predefined maximum modulation amplitude of the default amplitude modulation scheme.

Although, PAM scheme with power of two levels are schematically illustrated in FIG. 9 and described above with reference to FIG. 9, a skilled person will understand from the above description, that modulation schemes may be likewise applied, which comprise any numbers of discrete pulse amplitude levels and in particular non power of two numbers. For instance, the modulation scheme may be changed from PAM-16 (enabling to code 16 different symbols) to PAM-15 (enabling to code 15 different symbols). In this example, the downscaling factor for downscaling the maximum modulation amplitude is 16/15. The new maximum modulation amplitude is 15/16 of the predefined maximum modulation amplitude of the default amplitude modulation scheme (PAM-16). For instance, the modulation scheme may be changed from PAM-16 (enabling to code 16 different symbols) to PAM-10 (enabling to code 10 different symbols). In this example, the downscaling factor for downscaling the maximum modulation amplitude is 8/5. The new maximum modulation amplitude is 5/8 of the predefined maximum modulation amplitude of the default amplitude modulation scheme (PAM-16).

In an operation S221, a new modulation scheme is selected. A set of predefined modulation schemes may be provided. The selecting a new modulation scheme includes selecting a new modulation scheme from the set of predefined modulation schemes. In an example, the set of predefined modulation schemes comprises a set of PAM modulation schemes, each of which having a different PAM level. In order to reduce the maximum modulation amplitude, a PAM scheme with lower complexity is selected.

In an operation S222, the peak-to-peak voltage Vpp of the TX signal is adjusted in accordance with a new maximum modulation amplitude, which dependent on the selected new modulation scheme. In an example, the peak-to-peak voltage Vpp of the TX signal is adjusted to have a maximum according to the new maximum modulation amplitude. The new maximum modulation amplitude is based on the relationship of the modulation levels (the number of discrete levels for distinct modulation symbols) of selected new scheme. In an example, the new maximum modulation amplitude is based on a current maximum modulation amplitude and a downscale factor, which corresponds to the ratio of the levels of the current modulation scheme and levels of the new modulation scheme.

In an operation S223, the selected new modulation scheme is for instance reported to the higher layers, including in particular the MAC layer via the MII 440, and the counterpart node.

FIG. 6d illustrates a flow diagram. Accordingly, at stop S230, adopting data rate procedure is performed. At step S231 a new modulation scheme is selected. At step S232, the selected new modulation scheme is reported to the higher layers.

Referring now to FIG. 7c, a block diagram is shown, which schematically illustrates an TX signal adjustment based on scaling the amplitude of the TX signal on the transmit path of the transmit section of a transceiver (TX/RX PHY) according to an embodiment of the present application. Those skilled in the art will immediately appreciate that the block diagram of FIG. 7c has been simplified to the components involved in scaling of the amplitude of the TX signal. The description of the aforementioned embodiments of the transceiver (TX/RX PHY) should be read into the present embodiment.

The frequency transform coefficient may be provided by the frequency transform component (e.g. the FFT component 515) or the RX reporting component 525 to a modulation control component 630, which in response to a detected violation of the EME requirements, configures the symbol modulation component 460 to apply a less complex modulation scheme, which allows to downscale the maximum modulation amplitude for the analog TX signal output by the transmitter section 450 of the transceiver (TX/RX PHY). As described above, the modulation control component 630 may control the symbol modulation component 460 to apply a PAM modulation with lower PAM level (preferably being some power of two level). The downscaling of the maximum modulation amplitude is for instance enabled by a Vpp scaling component 635, which receive an indication of the maximum modulation amplitude and which control the digital-to-analog converter (DAC) 465 accordingly, which converts the digital stream of symbols output by the symbol modulation component 460 into an analog signal. In an example, the digital-to-analog converter (DAC) 465 has a configurable output range, which is configured by the Vpp scaling component 635 coupled thereto.

The exemplary transceiver (TX/RX PHY) may further comprise a rate requesting component 645, which is configured to inform higher layers (such as the MAC layer) about the change of data rate due to the selected symbol modulation scheme, and/or a header component 640, which is arranged to generate a message for transmittal to the counterpart node informing the counterpart node about the selected modulation scheme for enabling the counterpart node to decode following data communication being modulated according to the selected new modulation scheme. The header component 640 is arranged to supply the generated message to the transmit path TX of the TX section 450. In an example, the header component 640 is coupled to and arranged to inject the generated message into the transmit path TX of the TX section 450.

The exemplary transceiver (TX/RX PHY) may further comprise a modulation report component 650, which is configured to receive a request informing about a modulation scheme used by the counterpart node for data communication. On receiving such a request, the modulation report component 650 is arranged to configure the RX section 400 in accordance with the reported modulation scheme. Accordingly, the RX section 400 is enabled to receive following data communication modulated in accordance with the reported modulation scheme.

The modulation report component 650 may be further configured to receive a request requesting the node to use a new modulation scheme (and new data rate) for data transmission. The modulation report component 650 is coupled to the modulation control component 630 and reports the requested modulation scheme (and data rate) to the modulation control component 630, which accordingly controls the symbol modulation of the TX section 450.

Figure 10A:
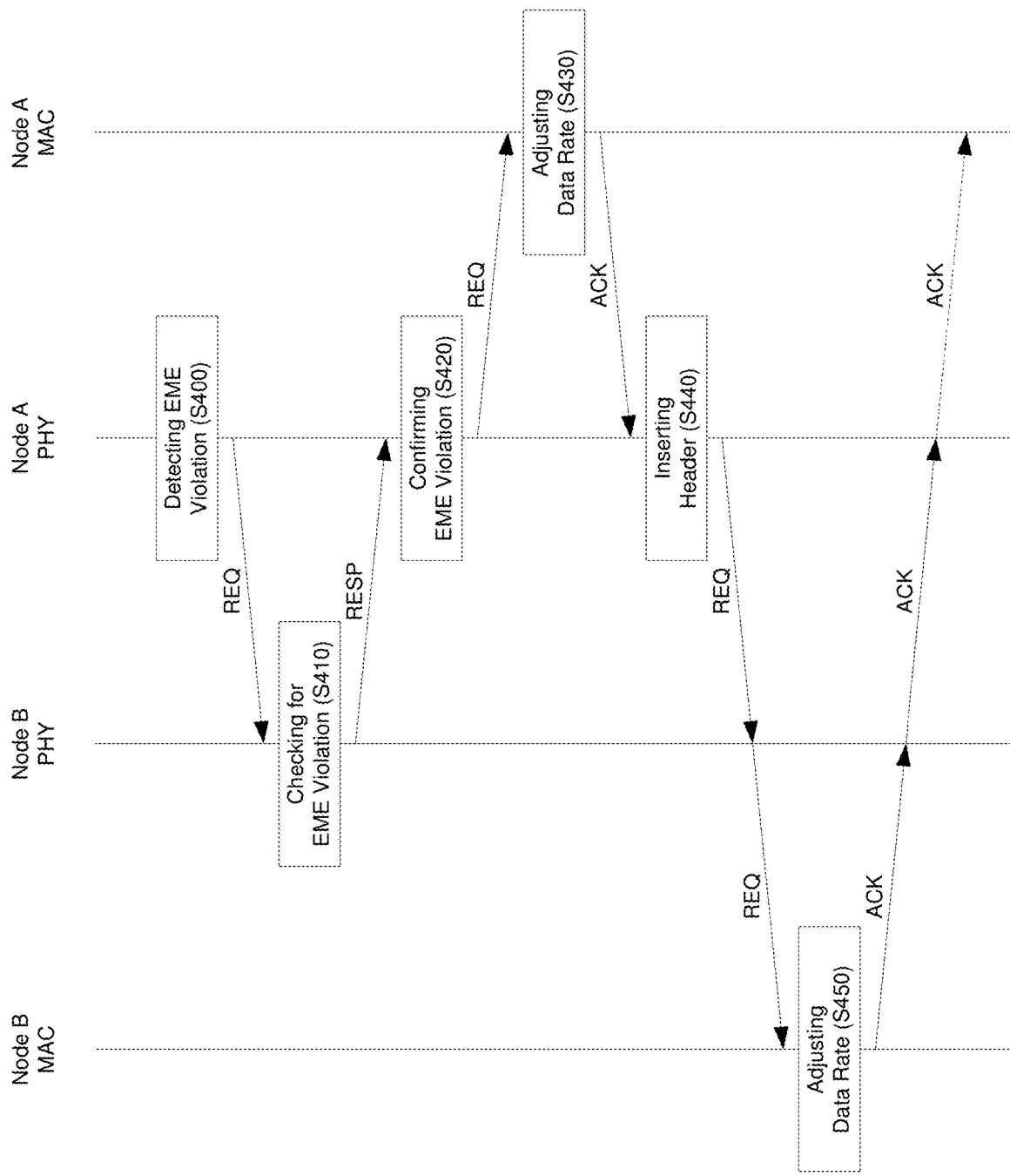
FIGS. 10a and 10b schematically illustrate flow diagrams relating to handshaking procedures for changing the modulation according to examples of the present application.
Figure 10B:
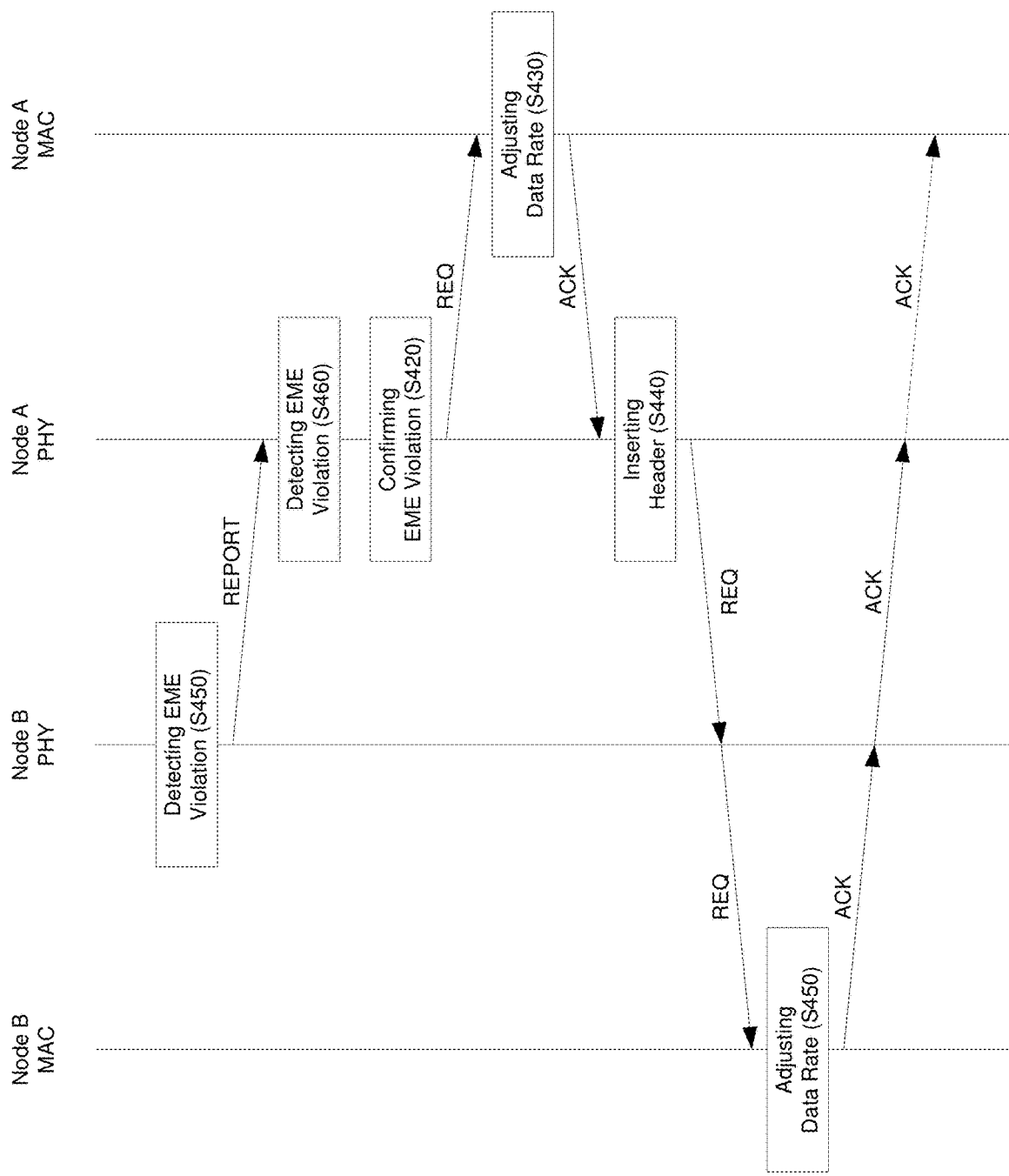

Referring now to FIGS. 10a and 10b, schematic flow diagrams are illustrated, which relate to exemplary handshaking procedures for changing the modulation scheme used for data communication over a communication link between link partner nodes according to embodiments of the present application. The schematic flow diagrams illustrated in FIGS. 10a and 10b relate to example scenarios, which differ in the EME violation detection sequence in advance of the handshaking procedure for changing the modulation scheme.

Referring first to FIG. 10a, a EME violation is detected by for instance node A in an operation S400. In an example, the EME violation relates to a common mode signal(s) occurring on the cable of the communication link for instance due to mode conversion. In response to the detected EME violation, node A sends a request to node B requesting for checking the EME. Node B receiving the request performs an EME detection for verifying whether nor not an EME violation is also present at node B in an operation S410. In a request response node B informs node A about the results of the EME detection. The result may comprise an indication whether or not node B has detected an EME violation. An example of detecting an EME violation on the communication link has been described above with reference to FIG. 4. On confirmation that node B has detected an EME violation, a handshake procedure to change the modulation is initiated by node A.

The EME violation detection may be performed at the transceivers (TX/RX PHY) of the nodes A and B. Higher layer functionalities such as MAC layer functionalities may not be involved in EME violation detection as exemplified above with reference to FIG. 5 in conjunction with FIG. 4.

In response to the confirmation of EME violation detected at both nodes A and B communication with each other over the communication link, a request is generated at the transceiver (TX/RX PHY) of node A and transmitted to the MAC (Media Access Control) of node A via the MII for requesting an adjusting of the data rate, which corresponds to a new modulation scheme. The request is for instance generated by rate requesting component 645 described above with reference to FIG. 7c in conjunction with FIG. 6c.

On receiving an acknowledgment from the MAC of node A indicating that the requested data rate is adopted by the high layers of node A in an operation S430, a message for transmittal to node B is generated in an operation S440. The message informs node B about the new modulation scheme and the new data rate, for enabling node B to decode following data communication. The message further requests the node B to also change to the new modulation scheme and the new data rate. The message is for instance generated by the header component 640 described above with reference to FIG. 7c in conjunction with FIG. 6c.

The message is transmitted by the transceiver (TX/RX PHY) of node A to node B, where the message is received and the RX section of node B is configured according to the new modulation scheme used by the transceiver (TX/RX PHY) of node A. Further the TX section of the node B is further configured to likewise use the new modulation scheme, where the symbol modulation is accordingly configured.

On receiving an acknowledgment from the MAC of node B indicating that the requested data rate is adopted by the high layers of node B in an operation S450 in response to a request generated at the transceiver (TX/RX PHY) of node B and transmitted to the MAC (Media Access Control) of node B via the MII for requesting an adjusting of the data rate, which corresponds to the new modulation scheme, the new modulation scheme is configured at the transceiver (TX/RX PHY) of node B. The changing of the modulation scheme at node B is for instance controlled by the modulation report component 650, the modulation control component 630 and the rate requesting component 645 described above with reference to FIG. 7c in conjunction with FIG. 6c.

An acknowledgement may be further transmitted by the node B and in particular the transceiver (TX/RX PHY) of node B to the node A. In response to the acknowledgement received at the transceiver (TX/RX PHY) of node A, the RX section of the RX section of node B is configured according to the new modulation scheme used by the transceiver (TX/RX PHY) of node B. The acknowledgement may be further passed to higher layers of the node A including in particular the MAC layer of node A for informing about the new data rate of the data communication transmitted by node B.

Referring next to FIG. 10b, a EME violation is detected by for instance node B in an operation S450. In response to the detected EME violation, node B sends a report request to node A reporting the detected EME violation and requesting for checking the EME. Node A receiving the request performs an EME detection for verifying whether nor not an EME violation is also present at node A in an operation S460. An example of detecting an EME violation on the communication link has been described above with reference to FIG. 4.

On confirmation that node A has also detected an EME violation, a handshake procedure to change the modulation is initiated by node A. The handshake procedure for changing the modulation corresponds to the handshake procedure described above with reference to FIG. 10a. A repetition is omitted.

For the above description, it is immediately apparent to those skilled in the art that the change of modulation procedure may be applied to maintain the data communication over the communication link in case of a disturbed data communication over the communication link by reducing the data rate in conjunction with relaxed EME requirements to be met.

Figure 11:
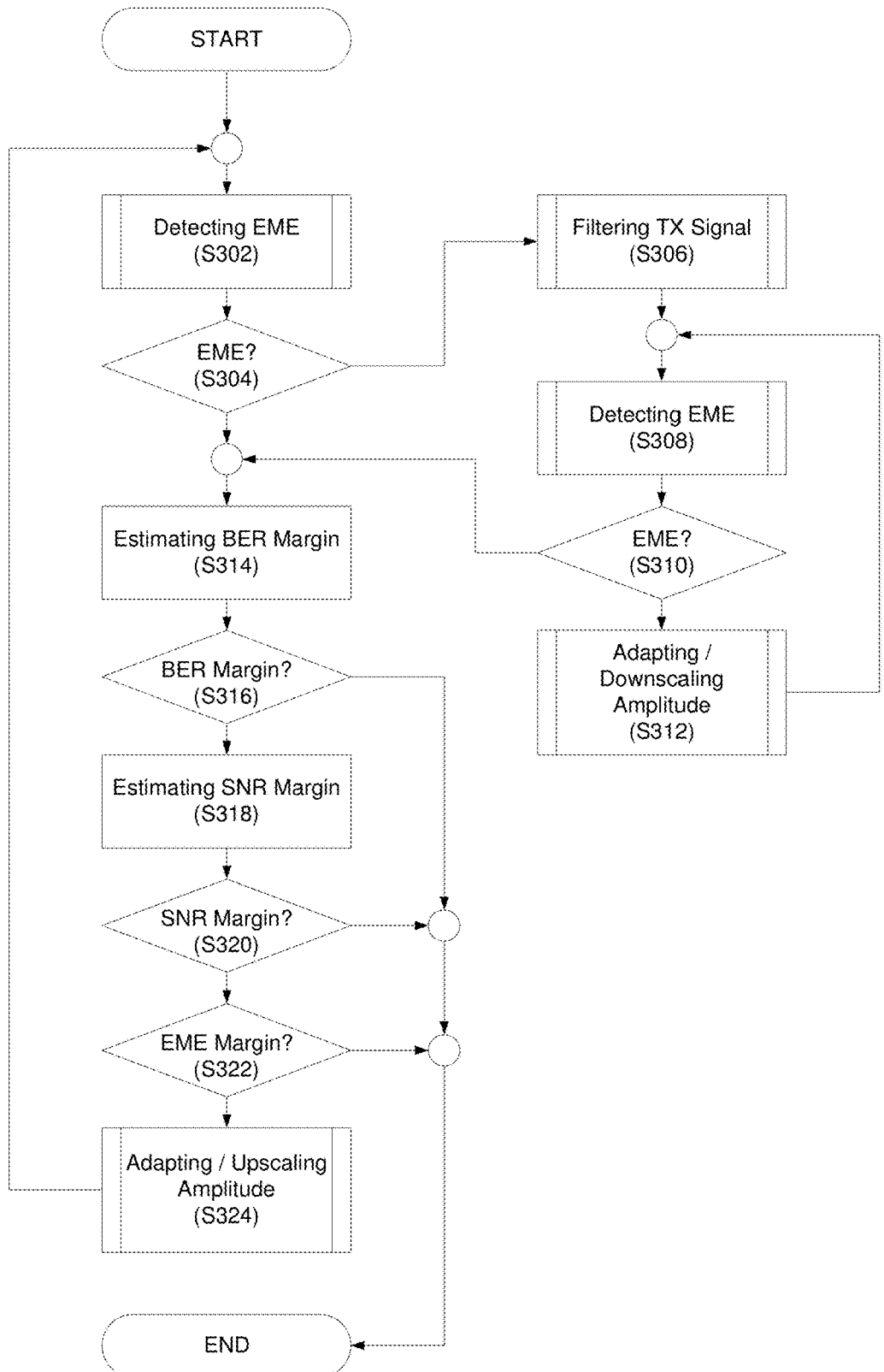
FIG. 11 schematically illustrates a flow diagram of a method to reduce the EME on a cable of a communication link between link partner nodes.

Above, the detection of EME including the technical implementations enabling the EME detection as well as measures to at least reduce the detected EME violating EME requirements have been discussed. Although the measures to at least reduce the detected EME violating EME requirements have been discussed separately, those skilled in the art appreciate from the above description that one or more of them may be combined in more complex control loops. An example of such a complex control loop is shown in FIG. 11, which schematically illustrates a flow diagram of a method to reduce the EME on a cable of a communication link between nodes A and B.

In an operation S302, the electromagnetic emission (EME) present on the cable of the communication link between the two connected nodes is detected. In an example, the EME includes common mode signal(s) occurring on the cable of the communication link for instance due to mode conversion. The EME detection is described above in more detail with reference to FIGS. 4a to 4c.

In an operation S304, the detected EME is compared with an EME threshold. The EME threshold may be predefined.

In case of a violation of the EME threshold, the operational sequence branches to an operation S306. Otherwise, the operational sequence branches to an operation S314.

In an operation S306, i.e. in response to a detected violation of the EME requirements, a filtering of the TX signal is performed. The filtering of the TX signal is described above in more details with reference to FIGS. 6b and 7b.

In next operations S308 and S310, the electromagnetic emission (EME) present on the cable of the communication link between the two connected nodes is detected and the detected EME is compared with the EME threshold. The repeated EME detection allows to check the effect/efficiency of the TX signal filtering configured in the above operation S306.

In case of a violation of the EME threshold, the operational sequence branches to an operation S312. Otherwise, the operational sequence branches to an operation S314.

In an operation S312, the amplitude of the TX signal is adapted to a lower maximum peak-to-peak voltage Vpp in accordance with a downscaled maximum modulation amplitude in order to further reduce the detected EME still violating the EME requirements. The adapting of the TX signal amplitude is described above in more details with reference to FIGS. 6c and 7c. The operational sequence continues with the operation S308, in which the EME detection is again repeated.

In an operation S314, the BER margin is estimated. The BER margin results from an estimated bit error rate (BER) of the data communication over the communication link and a BER target, which may be a predefined BER target. The BER margin may be the difference between the BER of the data communication over the communication link and the BER target.

In an operation S316, the estimated BER margin is compared with the BER margin threshold, which may be predefined. In case the estimated BER margin exceeds the BER margin threshold, the sequence ends. Otherwise, in case there is a sufficient BER margin (the estimated BER margin is below the BER margin threshold), the operational sequence continues with an operation S318.

In the operation S318, a signal-to-noise ratio (SNR) margin is estimated. The SNR margin results from an estimated signal-to-noise ratio (SNR) of the data communication over the data communication over the communication link and a SNR target, which may be a predefined SNR target. The SNR margin may be the difference between the SNR of the data communication over the communication link and the SNR target.

In an operation S320, the estimated SNR margin is compared with the SNR margin threshold, which may be predefined. In case the estimated SNR margin is below the SNR margin threshold, the sequence ends. Otherwise, in case there is a sufficient SNR margin (the estimated SNR margin exceeds the SNR margin threshold), the operational sequence continues with an operation S322.

In the operation S322, it is further checked whether an EME margin, which is based on the detected EME and a EME target, exceeds a EME threshold. The EME target and/or the EME threshold may be predefined. If the EME margin exceeds the EME threshold, it is assumed that the signal quality (determined on the basis of the checks of the estimated BER margin, the estimated SNR margin and EME margin) on the cable of the communication link is good enough for increasing the data communication rate.

In an operation S324, the amplitude of the TX signal is adapted/upscaled to a maximum higher peak-to-peak voltage Vpp in order to increase the data communication rate by selecting a new modulation with higher complexity. The operational sequence return to operation S302.

Although not explicitly described above with respect to the FIGS. 6c and 7c, those skilled in the art understand that the suggested procedure and components for adapting the amplitude of the TX signal is likewise applicable to downscale the maximum modulation amplitude (and the maximum peak-to-peak voltage Vpp) of the TX signal as well as to upscale the maximum modulation amplitude (and the maximum peak-to-peak voltage Vpp) of the TX signal by selecting modulation scheme with either lower or higher complexity. In an example, lower complexity means lower PAM level and lower data rate and higher complexity means higher PAM level and higher data rate.

According to an embodiment, a transceiver, TX/RX PHY, arranged for bi-directional data communication of a node with a counterpart node connected to in a point-to-point network using differential mode signaling over a single twisted-pair cable is provided. A TX adjustment component is arranged in a TX path of the TX/RX PHY and configured to adjust a TX data communication signal generated by the TX/RX PHY for transmittal to the counterpart node. The TX adjustment component is further configured to accept information about a common mode signal detected on the single twisted-pair cable and to adjust the TX data communication signal to at least weaken the common mode signal occurring at the counterpart node in response to transmitting the TX data communication signal.

According to an example, the TX adjustment component comprises at least one of a cancellation signal generator, a filter component and an amplitude adaptation component. The cancellation signal generator is configured to generate an inverse common mode cancellation signal, which is injected into the TX path of the TX/RX PHY. The filter component is configured to filter the TX data communication signal based on the information about a common mode signal. The amplitude adaptation component is configured to adapt the amplitude of the TX data communication signal.

According to an example, the cancellation signal generator comprises a coefficient control component and a conversion matrix component. The coefficient control component is configured to estimate at least one frequency range, in which the detected common mode signal exceeds a predefined threshold. The conversion matrix component is configured to determine matrix coefficients based on the at least one estimated frequency range and to configure the cancellation signal generator based on the determined matrix coefficients.

According to an example, the filter component comprises a coefficient control component and a finite impulse response, FIR, filter component. The coefficient control component is configured to estimate at least one frequency range, in which the detected common mode signal exceeds a predefined threshold, to determine filter coefficients based on the at least one estimated frequency range, and to configure the FIR filter component based on the determined filter coefficients.

According to an example, the amplitude adaptation component comprises a modulation control component, a symbol modulation component and an amplitude scaler component. The modulation control component is provided with several predefined modulation schemes and configured to select a new modulation scheme out of several predefined modulation schemes based on the information about the detected common mode signal. The number of symbols of the new modulation scheme is less than the number of symbols of a current modulation. The symbol modulation component is configured to apply the new predefined modulation scheme for TX data communication of the TX/RX PHY with the counterpart node. The amplitude scaler component is configured to adjust the amplitude of the TX data communication of the TX/RX PHY in accordance with the new predefined modulation scheme.

According to an example, the transceiver further comprises at least one of a RX reporting component and a detection section. The RX reporting component is configured to receive the information about the detected common mode signal from the counterpart node and to provide the information about the detected common mode signal to the TX adjustment component. The detection section is configured to detect the common mode signal on the single twisted-pair cable and to provide the information about the detected common mode signal to the TX adjustment component.

According to an example, the information about the detected common mode signal comprises frequency transformed coefficients of the detected common mode signal.

According to an embodiment, method of operating a transceiver, TX/RX PHY, arranged for bi-directional data communication of a node with a counterpart node connected to in a point-to-point network using differential mode signaling over a single twisted-pair cable is provided. Information about a common mode signal detected on the single twisted-pair cable is accepted. A TX data communication signal generated by the TX/RX PHY for communication with the counterpart node is adjusted to at least weaken the common mode signal occurring at the counterpart node in response to communication the TX data communication signal.

According to an example, the adjusting of the TX data communication signal comprises at least one of generating an inverse common mode cancellation signal and injecting the generated inverse common mode cancellation signal into the TX path of the TX/RX PHY; filtering the TX data communication signal based on the information about a common mode signal; and adapting the amplitude of the TX data communication signal in response to the information about a common mode signal.

According to an example, for inverse common mode cancellation signal an estimated frequency range is determined, in which the common mode signal exceeds a predefined threshold, matrix coefficients are determined based on the estimated frequency range and the information about the detected common mode signal, and an inverse mode conversion matrix is configured using the matrix coefficients. The inverse mode conversion matrix is provided in the TX path of the TX/RX PHY to generate the common mode cancellation signal based on the TX data communication signal.

According to an example, for filtering the TX data communication signal an estimated frequency range is determined, in which the common mode signal exceeds a predefined threshold, filter coefficients are determined based on the estimated frequency range and the common mode signal, and a FIR filter is configured using the FIR filter coefficients. The FIR filter is provided in the TX path of the TX/RX PHY to weaken the TX data communication signal in the estimated frequency range.

According to an example, for adapting the amplitude of the TX data communication signal a new modulation scheme out of several predefined modulation schemes is selected. The number of symbols of the new modulation scheme is less than the number of symbols of a current modulation, and a maximal amplitude of the TX data communication signal is scaled based on the numbers of symbols of the current and the new modulation scheme.

According to an embodiment, a transceiver is provided, which is arranged for bi-directional data communication of a node with a counterpart node connected to a point-to-point network using differential mode signaling over a single twisted-pair cable. The transceiver, TX/RX PHY, comprises a common mode choke, a switching arrangement and a detection section. The common mode choke is arranged between of the TX/RX PHY and the single twisted-pair cable and provided for common mode current suppression. The switching arrangement is further arranged between the TX/RX PHY, the common mode choke and the single twisted-pair cable and configured to switchably change a polarity of one of the windings of the common mode choke. The detection section is coupled via the switching arrangement to the common mode choke and configured to detect a common mode signal on the single twisted-pair cable in response to a transmission of a test signal by the counterpart node. For detecting the common mode signal, the switching arrangement is operated to change the polarity of the one winding of the choke such that the common mode choke operates functionally as differential mode choke. For bi-directional data communication, the switching arrangement is operated to maintain the original polarity of the one winding such that the common mode choke operates functionally as common mode choke.

According to an example, the detection section further comprises an amplifier coupled to the common mode choke and configured to amplify a common mode signal present on the single twisted-pair cable; an analog-to-digital converter coupled to the amplifier and configured to sample the common mode signal; and a frequency transform component coupled to the analog-to-digital converter and configured to frequency transform the sampled common mode signal output by the analog-to-digital converter.

According to an example, the detection section further comprises a TX reporting component configured to generate a report relating to the detected common mode signal. The generated report is for transmittal to the counterpart node.

According to an example, the TX reporting component is further configured to inject the generated report into a TX path of the TX/RX PHY; and/or to supply the generated report via a media independent interface, MII, to a media access layer, MAC, of the node for transmittal to the counterpart node.

According to an example, the detection section further comprises a test signal generator configured to generate a test signal for asserting on the single twisted-pair cable, to which the counterpart node is connected. The test signal generator is coupled to a TX path of the TX/RX and configured to inject the test signal into the TX path.

According to an example, the test signal is a differential mode test signal.

According to an embodiment, a system is provided, which comprises a transceiver, TX/RX PHY, and a differential mode choke. The TX/RX PHY is arranged for bi-directional data communication of a node with a counterpart node connected to a point-to-point network using differential mode signaling over a single twisted-pair cable. The TX/RX PHY has a common mode choke and a detection section. The common mode choke is arranged between of the TX/RX PHY and the single twisted-pair cable and is provided for common mode current suppression. The differential mode choke is arranged between the TX/RX PHY and the single twisted-pair cable and in parallel to the common mode choke and provided for differential mode current suppression. The detection section is coupled to the differential mode choke and configured to detect a common mode signal on the single twisted-pair cable in response to a transmission of a test signal by the counterpart node.

According to an example, the detection section further comprises an amplifier coupled to the common mode choke and configured to amplify a common mode signal present on the single twisted-pair cable; an analog-to-digital converter coupled to the amplifier and configured to sample the common mode signal; and a frequency transform component coupled to the analog-to-digital converter and configured to frequency transform the sampled common mode signal output by the analog-to-digital converter.

According to an example, the detection section further comprises a TX reporting component configured to generate a report relating to the detected common mode signal. The generated report is for transmittal to the counterpart node.

According to an example, the TX reporting component is further configured to inject the generated report into a TX path of the TX/RX PHY; and/or to supply the generated report via a media independent interface, MII, to a media access layer, MAC, of the node for transmittal to the counterpart node.

According to an example, the detection section further comprises a test signal generator configured to generate a test signal for asserting on the single twisted-pair cable, to which the counterpart node is connected. The test signal generator is coupled to a TX path of the TX/RX and configured to inject the test signal into the TX path.

According to an example, the test signal is a differential mode test signal.

According to an embodiment, a method of detecting a common mode signal on a single twisted-pair cable used for bi-directional data communication between a node and a counterpart node of a point-to-point network using differential mode signaling is provided. A choke is operated in differential mode current suppression. The choke is connected to the single twisted-pair cable. A test signal is asserted on the single twisted-pair cable. A common mode signal is detected on the single twisted-pair cable occurring in response to the assertion of a test signal by the counterpart node using a detection section of a transmitter, TX/RX PHY, of the node.

According to an example, the choke is a common mode choke. A polarity of one of the windings of the common mode choke is switchably changed to operate the choke in differential mode current suppression.

According to an example, the choke is a differential mode choke, which is arranged in parallel to a common mode choke. The common mode choke and the differential mode choke are coupled to the single twisted-pair cable. The differential mode choke and the detection section are used for detecting the common mode signal on the single twisted-pair cable.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To illustrate clearly this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A transceiver arranged for bi-directional data communication of a node with a counterpart node connected in a point-to-point network using differential mode signaling over a single twisted-pair cable, the transceiver comprising:
   a transmitted (TX) adjustment component arranged in a TX path of the transceiver and configured to
      adjust a TX data communication signal generated by the transceiver for transmittal to the counterpart node,
      accept information about a common mode signal detected on the single twisted-pair cable, and
      adjust the TX data communication signal to at least weaken the common mode signal occurring at the counterpart node in response to transmitting the TX data communication signal, wherein the TX adjustment component comprises a cancellation signal generator configured to generate an inverse common mode cancellation signal, which is injected into the TX path of the transceiver, and the cancellation signal generator comprises a coefficient control component configured to estimate at least one frequency range in which the detected common mode signal exceeds a predefined threshold.

2. The transceiver of claim 1, wherein the TX adjustment component further comprises at least one of:
a filter component configured to filter the TX data communication signal based on the information about a common mode signal; and
an amplitude adaptation component configured to adapt the amplitude of the TX data communication signal.

3. The transceiver of claim 2, wherein the cancellation signal generator further comprises:
a conversion matrix component configured to determine matrix coefficients based on the at least one estimated frequency range and to configure the cancellation signal generator based on the determined matrix coefficients.

4. The transceiver of claim 2, wherein the filter component further comprises:
a finite impulse response (FIR) filter component, wherein the coefficient control component is configured to determine filter coefficients based on the at least one estimated frequency range and to configure the FIR filter component based on the determined filter coefficients.

5. The transceiver of claim 2, wherein the amplitude adaptation component further comprises:
a modulation control component,
a symbol modulation component, and
a signal scaler component, wherein the modulation control component is provided with several predefined modulation schemes and configured to
select a new modulation scheme out of the several predefined modulation schemes based on the information about the detected common mode signal, a number of symbols of the selected new modulation scheme is less than a number of symbols of a current modulation scheme, the symbol modulation component is configured to
apply the selected new modulation scheme for TX data communication of the transceiver with the counterpart node, and the signal scaler component is configured to
adjust an amplitude of analog signals carrying the TX data communication of the transceiver in accordance with a new maximum modulation amplitude being a function of the selected new modulation scheme.

6. The transceiver of claim 1, further comprising:
a RX reporting component configured to:
receive the information about the detected common mode signal from the counterpart node and
provide, with a detection section, the information about the detected common mode signal to the TX adjustment component, and
detect, with the detection section, the common mode signal on the single twisted-pair cable.

7. The transceiver of claim 1, wherein the information about the detected common mode signal comprises frequency transformed coefficients of the detected common mode signal.

8. A method of operating a transceiver arranged for bi-directional data communication of a node with a counterpart node connected in a point-to-point network using differential mode signaling over a single twisted-pair cable, wherein the method comprises:
accepting information about a common mode signal detected on the single twisted-pair cable;
adjusting a TX data communication signal generated by the transceiver for communication with the counterpart node to at least weaken the common mode signal occurring at the counterpart node in response to communication the TX data communication signal;
determining an estimated frequency range in which the common mode signal exceeds a predefined threshold;
determining finite impulse response (FIR) filter coefficients based on the estimated frequency range and the common mode signal.

9. The method of claim 8, wherein the adjusting of the TX data communication signal comprises at least one of:
generating an inverse common mode cancellation signal and injecting the generated inverse common mode cancellation signal into the TX path of the transceiver;
filtering the TX data communication signal based on the information about a common mode signal; and
adapting the amplitude of the TX data communication signal in response to the information about a common mode signal.

10. The method of claim 9, wherein the generating of the inverse common mode cancellation signal further comprises:
determining matrix coefficients based on the estimated frequency range and the information about the detected common mode signal; and
configuring an inverse mode conversion matrix using the matrix coefficients, wherein the inverse mode conversion matrix is used to generate the inverse common mode cancellation signal based on the TX data communication signal, and the inverse common mode cancellation signal is injected into the TX path of the transceiver.

11. The method of claim 9, wherein the filtering of the TX data communication signal further comprises:
configuring a FIR filter using the FIR filter coefficients, wherein the FIR filter is provided in the TX path of the transceiver to weaken the TX data communication signal in the estimated frequency range.

12. The method of claim 9, wherein adapting of the amplitude of the TX data communication signal further comprises:
selecting a new modulation scheme out of several predefined modulation schemes, wherein a number of symbols of the selected new modulation scheme is less than a number of symbols of a current modulation scheme;
applying the selected new modulation scheme by the transceiver for data communication with the counterpart node; and
scaling an analog signal carrying TX data communication of the transceiver in accordance with a maximum modulation amplitude, which is a function of the selected new modulation scheme.

13. The method of claim 12, wherein the maximum modulation amplitude of the selected new modulation scheme is downscaled from a maximum modulation amplitude of the current modulation scheme by a factor corresponding to a ratio of the numbers of symbols of the current modulation scheme and the new modulation scheme.

14. The method of claim 12, wherein the several predefined modulation schemes are distinct pulse amplitude modulation schemes.

* * * * *